(12) United States Patent
Kosugiyama

(10) Patent No.: US 8,532,439 B2
(45) Date of Patent: Sep. 10, 2013

(54) REPRODUCTION APPARATUS AND REPRODUCTION METHOD

(75) Inventor: Tsugumoto Kosugiyama, Hino (JP)

(73) Assignee: Olympus Imaging Corp., Tokyo (JP)

( * ) Notice: Subject to any disclaimer, the term of this patent is extended or adjusted under 35 U.S.C. 154(b) by 619 days.

(21) Appl. No.: 12/707,048

(22) Filed: Feb. 17, 2010

(65) Prior Publication Data

US 2010/0215274 A1    Aug. 26, 2010

(30) Foreign Application Priority Data

Feb. 20, 2009 (JP) ................................ 2009-038608

(51) Int. Cl.
*G06K 9/60* (2006.01)

(52) U.S. Cl.
USPC ............ 382/305; 382/118; 382/190; 348/130

(58) Field of Classification Search
USPC ........................ 382/118, 190, 305; 348/130
See application file for complete search history.

(56) References Cited

U.S. PATENT DOCUMENTS

| | | | | |
|---|---|---|---|---|
| 2004/0126038 | A1* | 7/2004 | Aublant et al. | 382/305 |
| 2006/0245624 | A1* | 11/2006 | Gallagher et al. | 382/118 |
| 2007/0257985 | A1* | 11/2007 | Estevez et al. | 348/143 |
| 2007/0277985 | A1* | 12/2007 | Hager et al. | 172/19 |

FOREIGN PATENT DOCUMENTS

| | | |
|---|---|---|
| CN | 101146178 | 3/2008 |
| CN | 101167087 | 4/2008 |
| JP | 2002-51280 | 2/2002 |
| JP | 2002-189757 | 7/2002 |
| JP | 2002189757 | * 7/2002 |
| JP | 2005-244614 | 9/2005 |
| JP | 2006-203574 | 8/2006 |
| JP | 2006203574 | * 8/2006 |
| JP | 2007-066251 | 3/2007 |
| JP | 2008-11316 | 1/2008 |
| JP | 2008-504625 | 2/2008 |
| JP | 2008-146624 | 6/2008 |
| JP | 2008146624 | * 6/2008 |
| WO | WO 2006/003516 | 1/2006 |
| WO | WO 2006/115939 | 11/2006 |

OTHER PUBLICATIONS

Office Action for Chinese Patent Application No. 201010117325.X, mailed Nov. 22, 2011 (5 pgs.) with translation (5 pgs.).
Notice of Rejection for Japanese Patent Application No. 2009-038608, mailed Feb. 26, 2013 (1 pg.) with translation (2 pgs.).
Office Action for Chinese Patent Application No. 201010117325.X, mailed Apr. 9, 2013 (7 pgs.).

* cited by examiner

*Primary Examiner* — Jayesh A Patel
(74) *Attorney, Agent, or Firm* — John C. Pokotylo; Straub & Pokotylo

(57) ABSTRACT

A reproduction apparatus includes an attribute information recording unit for recording image attribute information in which an attribute value representing an image attribute is set for each of image, a target image selector for selecting an image of interest from among the images, a search condition setting unit for setting, as a search condition, an attribute value related to the image of interest set in the image attribute information, a reproduction information generator for generating reproduction information by setting one of pieces of image attribute information that satisfies the search condition, a search condition selector for selecting the search condition as a reproduction search condition, and a search result reproducing unit for, when the reproduction search condition is selected by the search condition selector, reproducing a search result with respect to the image of interest by displaying, on a display unit, an image whose image attribute information is designated with the reproduction information as a reproduction object.

18 Claims, 22 Drawing Sheets

FIG.5

| IMAGE ID | PERSON INFORMATION | LOCATION INFORMATION | SHOOTING DATE |
|---|---|---|---|
| 10 | 0 | HAWAII | 2006/08/01 |
| 20 | 1 | HAWAII | 2006/08/02 |
| 30 | 2 | HAWAII | 2006/08/03 |
| 40 | 0 | HAWAII | 2006/08/04 |
| 50 | 0 | NEW YORK | 2007/05/01 |
| 60 | 2 | NEW YORK | 2007/05/01 |
| 70 | 2 | NEW YORK | 2007/05/02 |
| 80 | 0 | NEW YORK | 2007/05/02 |
| 90 | 0 | TOKYO | 2007/07/24 |
| 100 | 5 | TOKYO | 2007/07/24 |
| 110 | 2 | TOKYO | 2007/07/24 |
| 120 | 2 | TOKYO | 2007/07/30 |
| 130 | 1 | OKINAWA | 2007/07/30 |
| 140 | 2 | OKINAWA | 2007/07/30 |
| 150 | 0 | OKINAWA | 2007/07/31 |
| 160 | 2 | OKINAWA | 2007/07/31 |
| 170 | 0 | OKINAWA | 2007/08/01 |
| 180 | 2 | TOKYO | 2007/08/01 |
| 190 | 2 | TOKYO | 2008/01/01 |
| 200 | 2 | TOKYO | 2008/01/01 |
| 210 | 0 | TOKYO | 2008/01/01 |

FIG.7

| IMAGE ID | PERSON INFORMATION | LOCATION INFORMATION | SHOOTING DATE |
|---|---|---|---|
| 20 | 1 | HAWAII | 2006/08/02 |
| 30 | 2 | HAWAII | 2006/08/03 |
| 60 | 2 | NEW YORK | 2007/05/01 |
| 70 | 2 | NEW YORK | 2007/05/02 |
| 100 | 5 | TOKYO | 2007/07/24 |
| 110 | 2 | TOKYO | 2007/07/24 |
| 120 | 2 | TOKYO | 2007/07/30 |
| 130 | 1 | OKINAWA | 2007/07/30 |
| 140 | 2 | OKINAWA | 2007/07/30 |
| 160 | 2 | OKINAWA | 2007/07/31 |
| 180 | 2 | TOKYO | 2007/08/01 |
| 190 | 2 | TOKYO | 2008/01/01 |
| 200 | 2 | TOKYO | 2008/01/01 |

| IMAGE ID | PERSON INFORMATION | LOCATION INFORMATION | SHOOTING DATE |
|---|---|---|---|
| 130 | 1 | OKINAWA | 2007/07/30 |
| 140 | 2 | OKINAWA | 2007/07/30 |
| 150 | 0 | OKINAWA | 2007/07/31 |
| 160 | 2 | OKINAWA | 2007/07/31 |
| 170 | 0 | OKINAWA | 2007/08/01 |

| IMAGE ID | PERSON INFORMATION | LOCATION INFORMATION | SHOOTING DATE |
|---|---|---|---|
| 90 | 0 | TOKYO | 2007/07/24 |
| 100 | 5 | TOKYO | 2007/07/24 |
| 110 | 2 | TOKYO | 2007/07/24 |
| 120 | 2 | TOKYO | 2007/07/30 |
| 180 | 2 | TOKYO | 2007/08/01 |
| 190 | 2 | TOKYO | 2008/01/01 |
| 200 | 2 | TOKYO | 2008/01/01 |
| 210 | 0 | TOKYO | 2008/01/01 |

| IMAGE ID | PERSON INFORMATION | LOCATION INFORMATION | SHOOTING DATE |
|---|---|---|---|
| 130 | 1 | OKINAWA | 2007/07/30 |
| 140 | 2 | OKINAWA | 2007/07/30 |
| 160 | 2 | OKINAWA | 2007/07/31 |

FIG.22
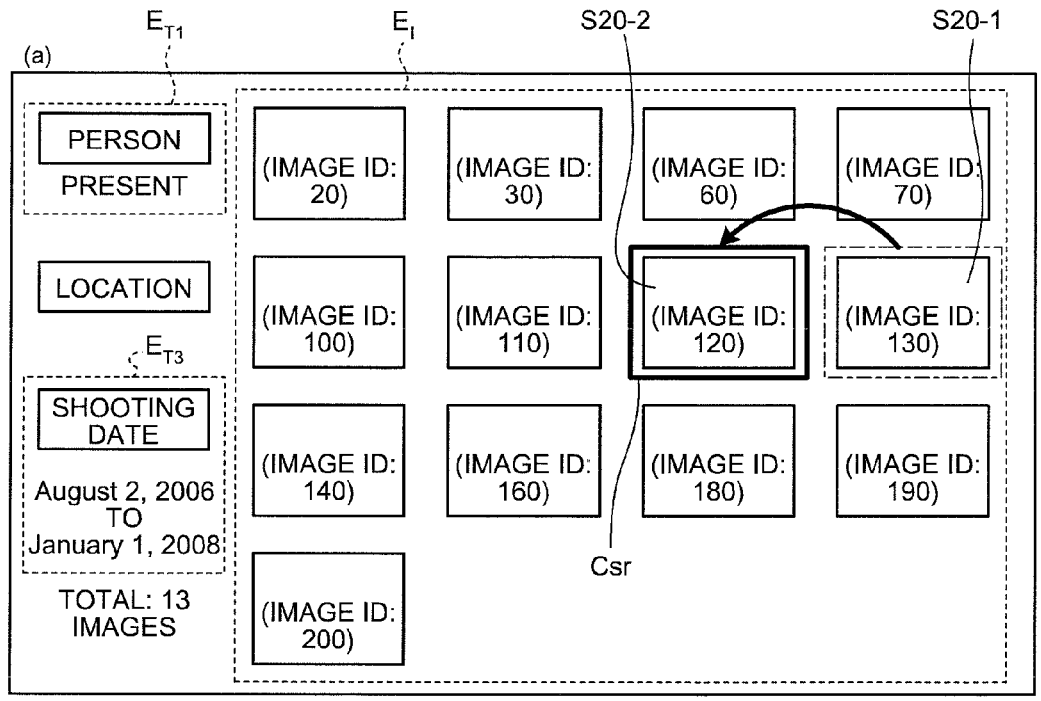
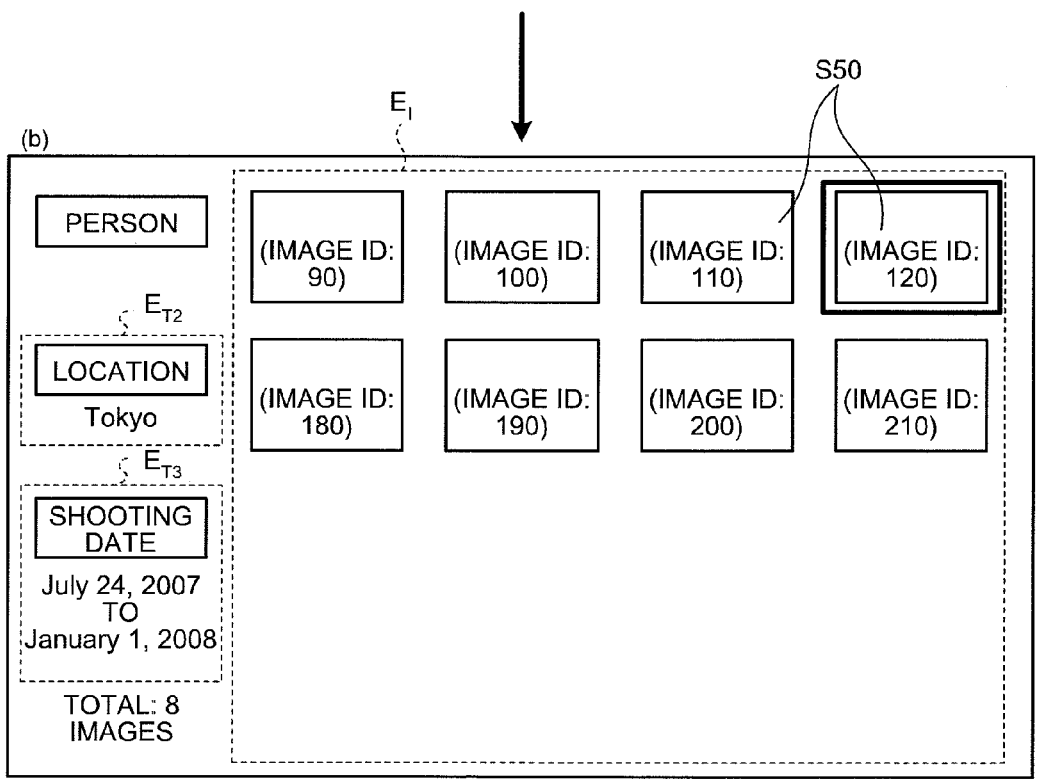

FIG. 23
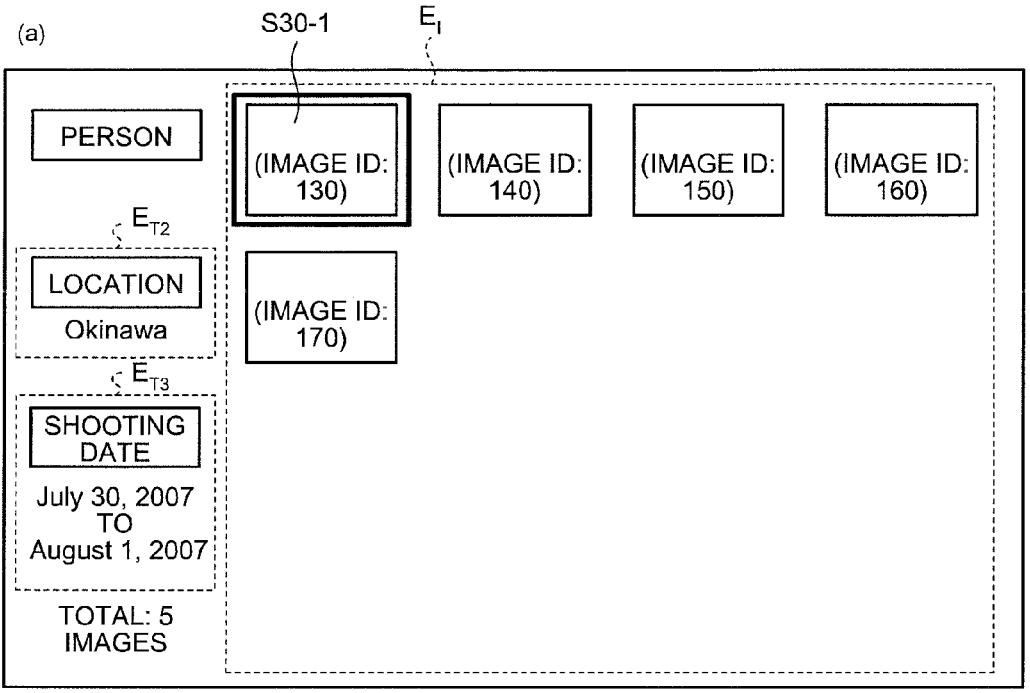
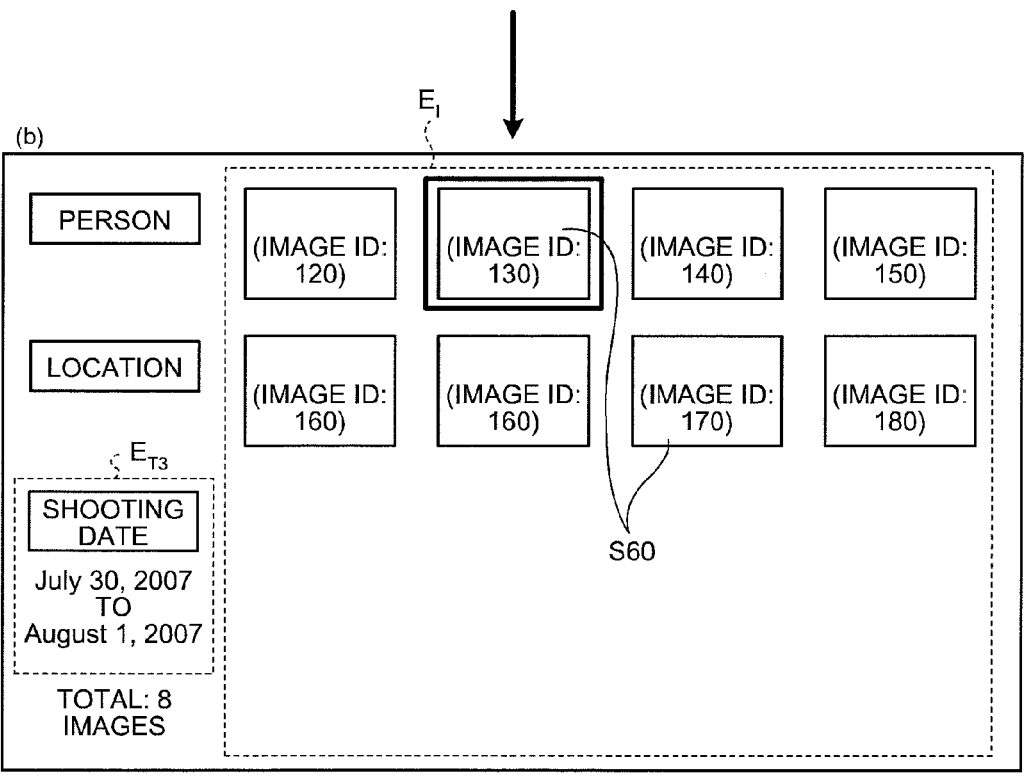

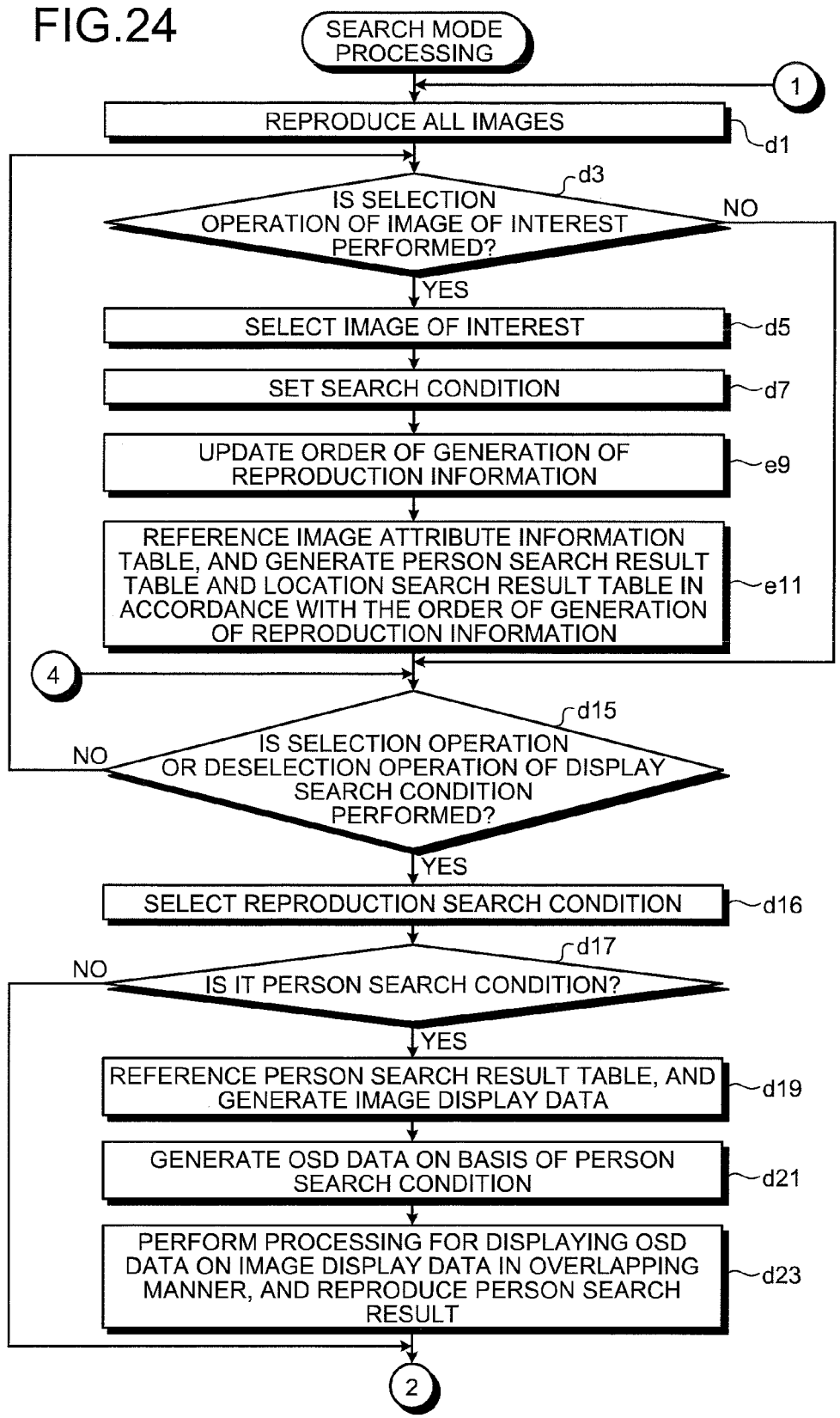

REPRODUCTION APPARATUS AND REPRODUCTION METHOD

CROSS-REFERENCE TO RELATED APPLICATIONS

This application is based upon and claims the benefit of priority from Japanese Patent Application No. 2009-038608, filed on Feb. 20, 2009, the entire contents of which are incorporated herein by reference.

BACKGROUND OF THE INVENTION

1. Field of the Invention

The present invention relates to reproduction apparatuses and reproduction methods, by which images are reproduced.

2. Description of the Related Art

Recently, digital cameras have had larger memory capacities, and therefore can record more than one thousand images. With the increased number of recordable images, users can take pictures without being concerned about memory capacities during photo shooting operation, but have to take care of a huge number of pictures during reproducing operation.

For example, Japanese Laid-open Patent Publication No. 2002-51280 discloses a technique for solving this kind of problem, which includes the steps of generating a list file recorded with image feature information, displaying the image feature information in the list, extracting a corresponding image file from the list file when a list condition is selected, and generating a search file from the extracted image file. Japanese Laid-open Patent Publication No. 2008-11316 discloses a technique including the steps of recording the amount of feature of recorded images as feature data, and referencing this feature data to display images quite similar to a subject image as related images.

SUMMARY OF THE INVENTION

A reproduction apparatus according to an aspect of the present invention is for reproducing an image, and includes an attribute information recording unit that records image attribute information in which an attribute value representing an image attribute is set for each image; a target image selector that selects an image of interest from among images; a search condition setting unit that sets, as a search condition, an attribute value related to the image of interest set in the image attribute information; a reproduction information generator that generates reproduction information by setting one of pieces of image attribute information that satisfies the search condition; a search condition selector that selects the search condition as a reproduction search condition; and a search result reproducing unit that reproduces a search result with respect to the image of interest by displaying, on a display unit, an image whose image attribute information is designated with the reproduction information as a reproduction object, when the reproduction search condition is selected by the search condition selector.

A reproduction method by which an image is reproduced by the reproduction apparatus that records image attribute information in which an attribute value representing an image attribute is set for each image, according to another aspect of the present invention, includes selecting an image of interest from among images; setting, as a search condition, an attribute value related to the image of interest set in the image attribute information; generating reproduction information by setting one of pieces of image attribute information that satisfies the search condition; selecting the search condition as reproduction search condition; reproducing a search result with respect to the image of interest by displaying an image whose image attribute information is designated with the reproduction information as a reproduction object, when the reproduction search condition is selected.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 shows an example of data structure of the image attribute information table;

FIG. 7 shows an example of a person search result table;

FIG. 8 shows an example of a location search result table;

FIG. 9 shows another example of the location search result table;

FIG. 10 shows an example of a person and location search result table;

FIG. 22 shows views another example of transition of the search result display screen upon operational input in the search mode;

FIG. 23 shows another example of transition of the search result display screen upon operational input in the search mode; and FIG. 24 is a flowchart illustrating a portion of the procedure of the search mode processing according to a variation.

DETAILED DESCRIPTION OF THE PREFERRED EMBODIMENTS

Figure 1:
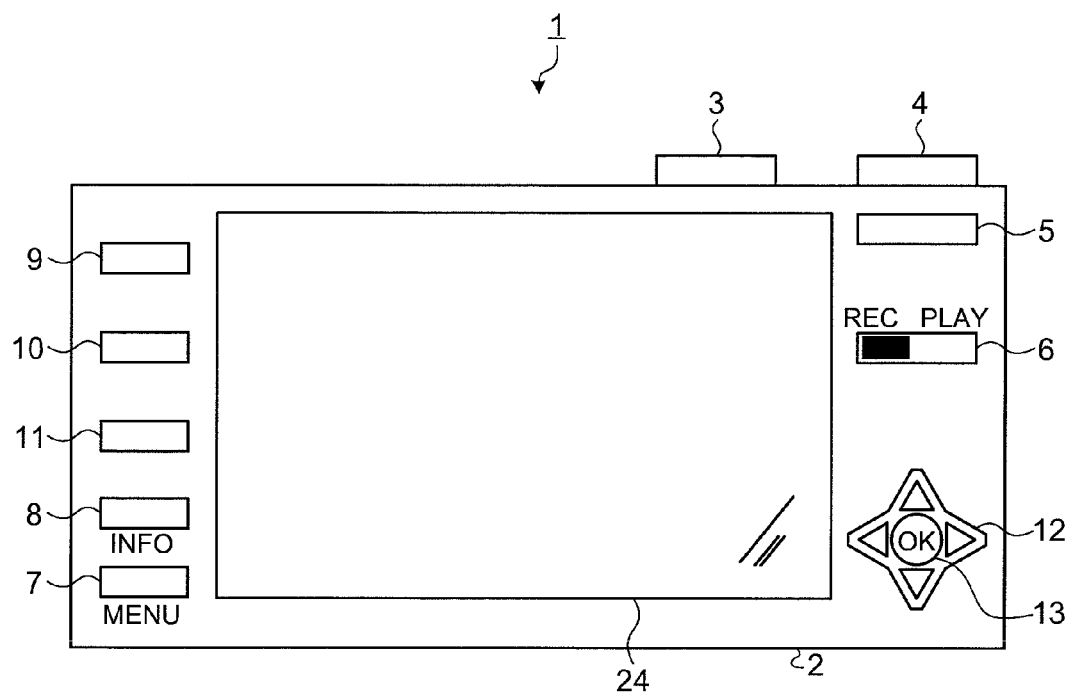
FIG. 1 is a back view of a digital camera.

Exemplary embodiments according to the present invention will be described in detail below with reference to the drawings. In the present embodiment, an example will be described where a reproduction apparatus according to an aspect of the present invention is applied to a digital camera. The present invention is not limited to this embodiment. In the drawings, the same units are attached with the same reference numerals.

FIG. 1 is a back view of a digital camera 1. As illustrated in FIG. 1, the digital camera 1 includes a power switch 3 and a release switch 4 arranged on an upper surface of a camera body 2, and further includes a zoom switch 5, a mode selector switch 6, a menu switch 7, an INFO switch 8, three function switches 9, 10 and 11, an arrow key 12, an OK switch 13 and a display unit 24 arranged on a back surface of the camera body 2. The release switch 4 is used to instruct a time of shooting. The three function switches 9, 10 and 11 are used to input various operations according to an operational mode of the digital camera 1. The arrow key 12 has up, down, left and right switches (an up switch, a down switch, a left switch, and a right switch). The OK switch 13 is used to decide operational content. The display unit 24 displays various screens. Although not illustrated in the figures, a flash and imaging lenses are arranged on the front surface of the camera body 2. In this embodiment, the mode selector switch 6 is used to switch the operational mode of the digital camera 1 between a photo shooting mode (recording mode) and a reproduction mode, and is made with, for example, a slide switch. The INFO switch 8 is used to switch a search mode of the digital camera 1 in the present embodiment.

The function switches 9, 10 and 11 are independently assigned with functions in each of the operational modes of the digital camera 1. In the present embodiment, the function switches 9, 10 and 11 are used in the search mode. More specifically, in the search mode of the present embodiment, a person and a location appearing in an image can be searched. The function switch 9 is used by a user for selection operation/deselection operation of a person search condition serving as a later-described reproduction search condition. The function switch 10 is used for selection operation/deselection operation of a location search condition serving as the reproduction search condition. In the present embodiment, images can be searched upon selecting a period of time, and the function switch 11 is used for selection operation of a period of time. Hereinafter, the function switch 9 used in the search mode is referred to as "person search switch 9", the function switch 10 used in the search mode is referred to as "location search switch 10", and the function switch 11 used in the search mode is referred to as "period selection switch 11".

In a search result screen shown in the display unit 24 during the search mode, a person search condition selected as the reproduction search condition is displayed in text at a position corresponding to the person search switch 9 (person search condition display area $E_{T1}$). A location search condition selected as a reproduction search condition is displayed in text at a position corresponding to the location search switch 10 (location search condition display area $E_{T2}$). A selected period is displayed in text at a position corresponding to the period selection switch 11 (photo shooting period display area $E_{T3}$). The above will be later described in detail with reference to FIG. 20.

Meanwhile, a side surface of the camera body 2 is arranged with a card slot, not shown, into which a portable recording medium is detachably attached. Image data of images taken in the photo shooting mode are written to, for example, a recording medium attached to this card slot. In the reproduction mode, the image data recorded in this recording medium are read out. Further, the side surface of the camera body 2 is arranged with a communication connector, not shown, having a data input terminal, so that the digital camera 1 can connect with an external apparatus via a communication cable. This communication connector may employ various types such as USE as necessary. In the present embodiment, the digital camera 1 is connected with an external apparatus such as a personal computer (PC) via this communication connector, so that the digital camera 1 can obtain image data from this external apparatus.

When a user presses the power switch 3 to turn on this digital camera 1, and slides the mode selector switch 6 to switch the operational mode to the photo shooting mode, the digital camera 1 is ready for taking pictures. In this photo shooting mode, a subject image incident through an imaging lens is output on every frame (for example, 1/30 seconds), and is displayed on the display unit 24 as a live view image in real time. A user takes still pictures and motion pictures by pressing the release switch 4 while seeing the live view image. When the power is turned on, and a user switches the operational mode to the reproduction mode by sliding the mode selector switch 6, the user can enjoy seeing the still pictures and motion pictures that were taken by the digital camera and are now displayed (reproduced) on the display unit 24. Alternatively, when a user switches the operational mode to the search mode by pressing the INFO switch 8, images taken in the past and images obtained from the external apparatus can be searched and displayed.

Figure 2:
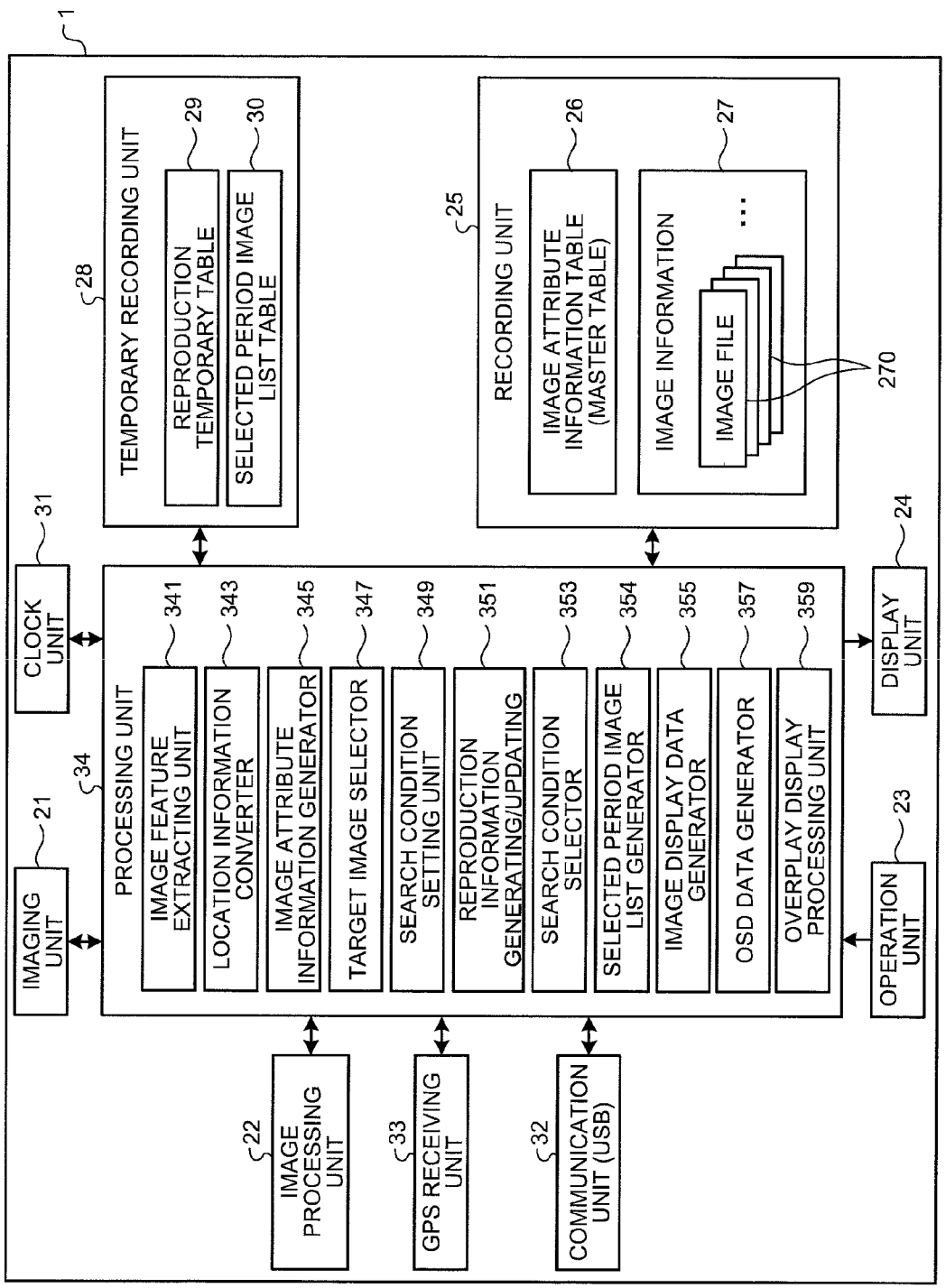
FIG. 2 is a block diagram illustrating an example of essential functional configurations of the digital camera.

FIG. 2 is a block diagram illustrating an example of essential functional configurations of the digital camera 1. As illustrated in FIG. 2, the digital camera 1 includes an imaging unit 21 serving as an image obtaining unit, an image processing unit 22, an operation unit 23, the display unit 24, a recording unit 25, a temporary recording unit 28, a clock unit 31, a communication unit (USB) 32 serving as an image obtaining unit and a GPS receiving unit 33.

The imaging unit 21 performs photoelectric conversion of a subject image incident through the imaging lens, and includes an imaging device such as a CCD (Charge Coupled Device) and a CMOS (Complementary Metal Oxide Semiconductor) for outputting an analog electric signal. The imaging unit 21 outputs image data upon converting the analog electric signal provided by the imaging device into a digital electric signal.

The image processing unit 22 performs various image processings on the image data output by the imaging unit 21, and performs conversion into image data suitable for recording and displaying. For example, when a photo is taken and image data of the photo image is recorded, or when the recorded image data is displayed, the image processing unit 22 performs compression processing and decompression processing on the image data according to JPEG (Joint Photo Experts Group) method. Further, the image processing unit 22 is adapted to reduce the size of the photo image to generate image data (thumbnail data) for showing a small image for displaying (thumbnails).

The operation unit 23 receives various operations performed by a user and notifies operational signals to a processing unit 34. The various operations performed by a user include, e.g., instruction of shooting a photograph (shooting instruction), switching of operational mode of the digital camera 1 to, e.g., the photo shooting mode, the reproduction mode, and the search mode, and setting of photo shooting conditions. This operation unit 23 includes the power switch 3, the release switch 4, the zoom switch 5, the mode selector switch 6, the menu switch 7, the INFO switch 8, the function switches 9, 10 and 11, the arrow key 12, and the OK switch 13.

The display unit 24 is adapted to display not only shot still pictures, motion pictures, and a live view image but also various setting information of the digital camera 1. The display unit 24 is made with a display device such as an LCD (Liquid Crystal Display) and an EL display (Electroluminescence Display). In the photo shooting mode, this display unit 24 sequentially displays the live view image in a motion picture manner by redrawing the live view image, for example, on every frame. In the reproduction mode and the search mode, the display unit 24 displays shot images or images obtained from the external apparatus via the communication unit 32.

The recording unit 25 is made with various semiconductor memories such as a rewritable flash memory and a ROM, a built-in hard disk, a hard disk connected via the data communication terminal, a recording medium such as a memory card, and a reading/writing device therefor. Any suitable recording device may be employed according the purpose of use as necessary. Alternatively, a combination of recording devices may be used. This recording unit 25 records, e.g., various camera programs for allowing the digital camera 1 to operate and achieve various functions of this digital camera 1, and records data used during execution of these camera programs. For example, the recording unit 25 stores an image attribute information table (master table) 26 as an attribute information recording unit.

Figure 3:
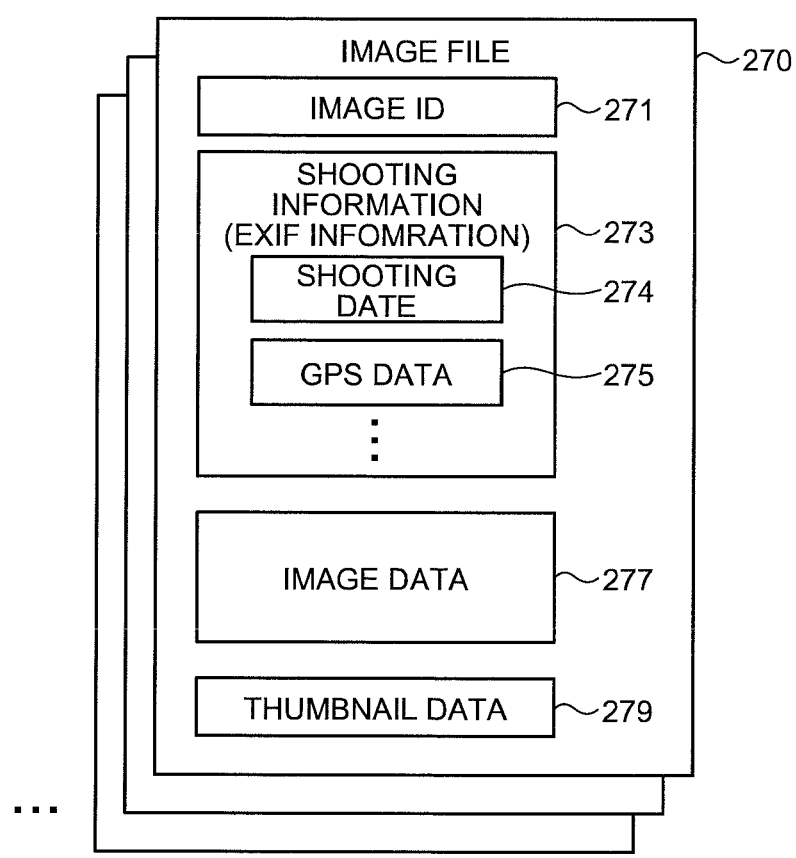
FIG. 3 shows an example of data structure of an image file.

Further, the recording unit 25 records image information 27, i.e., a plurality of image files 270. In the present embodiment, image data of photo images having been processed for recording by the image processing unit 22 are recorded to the recording unit 25 as the image files 270 in a file format attached with a header including EXIF (Exchangeable Image File) information. The EXIF information includes, for example, date of shooting, GPS data obtained during shooting, title, comment and private information. FIG. 3 shows an example of data structure of the image file. As illustrated in FIG. 3, the image file 270 includes an image ID 271, shooting information (EXIF information) 273 such as a shooting date 274 and GPS data 275, image data 277 of photo image, and thumbnail data 279 of photo image. The image ID 271 is identification information for uniquely distinguishing each image, and the image ID 271 is assigned when, for example, the image data is generated. Each image file 270 constituting the image information 27 includes not only image files of photo images taken by the digital camera 1 but also image files of images obtained by communicating with the external apparatus via the communication unit 32 (hereinafter referred to s "externally-obtained image") as necessary.

The temporary recording unit 28 is made with, for example, a semiconductor memory such as RAM, and is used as a work memory of the processing unit 34. This temporary recording unit 28 has a memory area for temporarily holding a program executed by the processing unit 34 and data related to execution of this program. For example, the temporary recording unit 28 temporarily records a reproduction temporary table 29 and a selected period image list table 30 as reproducing information. Further, the temporary recording unit 28 is used for temporarily recording image data output by the imaging unit 21, and temporarily records, e.g., image data of each frame of images captured by the imaging unit 21 (live view image) and image data of images captured by the imaging unit 21 at a time of photo shooting operation (photo image).

The clock unit 31 is adapted to measure date and time. The date and time of photo shooting can be identified by the current time measured by this clock unit 31. When image data of a photo image is recorded to the recording unit 25, the image data is recorded together with the identified shooting date and time.

The GPS receiving unit 33 receives radio wave for detecting a position, calculates current positional information (for example, latitude, longitude, and altitude) of the digital camera 1, and outputs the current positional information as GPS data to the processing unit 34. For example, the GPS receiving unit 33 is made with, e.g., an antenna for receiving radio wave transmitted from GPS (Global Positioning System) satellites and a calculation apparatus for calculating the positional information based on the radio wave received by the antenna. In the present embodiment, the location when an image is shot (photo shooting location) is identified based on the output provided by this GPS receiving unit 33.

The communication unit 32 is an apparatus for transmitting and receiving predetermined information to and from the external apparatus via the communication cable. This communication unit 32 allows connection between the digital camera 1 and the external apparatus such as PC according to a communication standard such as USB (Universal Serial Bus), and performs processing for transmitting and receiving the predetermined information to and from the external apparatus via the communication cable.

The processing unit 34 reads the camera program from the recording unit 25 according to operation signal given by the operation unit 23, and executes the camera program, thus performing overall control on the operation of the digital camera 1 by transferring data and giving instructions to the units constituting the digital camera 1. This processing unit 34 includes, e.g., a DMA controller for controlling DMA transfer between the CPU and the units, as necessary.

Further, the processing unit 34 includes an image feature extracting unit 341, a location information converter 343, an image attribute information generator 345 serving as an image attribute information generator and an image attribute information adding unit, a target image selector 347, a search condition setting unit 349, a reproduction information generating/updating unit 351 serving as a reproduction information generator, a search condition selector 353, a selected period image list generator 354 serving as a period setting unit, an image display data generator 355, an OSD (on screen display) data generator 357, and a overplay display processing unit 359.

The processings performed by the image feature extracting unit 341, the location information converter 343, the image attribute information generator 345, the target image selector 347, the search condition setting unit 349, the reproduction information generating/updating unit 351, the search condition selector 353, the selected period image list generator 354, the image display data generator 355, the OSD data generator 357, and the overplay display processing unit 359 may be achieved by hardware. Alternatively, a portion or all of the processings performed by these units may be achieved by the CPU, or may be achieved as software by causing the CPU to execute programs.

The image feature extracting unit 341 analyzes image data of a shot image or an externally-obtained image, and extracts feature information from the image data. The location information converter 343 converts the positional information into location information (photo shooting location) on the basis of the GPS data 275. The image attribute information generator 345 generates image attribute information of a shot image or an externally-obtained image, on the basis of the image ID 271 and the shooting date 274 set as the shooting information 273 in the image file 270, the feature information extracted by the image feature extracting unit 341, and the location information converted by the location information converter 343.

The target image selector 347 receives selection operation of an image of interest (hereinafter, "target image") from a user, and selects the image of interest according to the received selection operation. When the image of interest is selected by the target image selector 347, the search condition setting unit 349 sets a search condition on the basis of the image attribute information of the selected image of interest. In the present embodiment, three search conditions are set.

When the search condition setting unit 349 sets a search condition, the reproduction information generating/updating unit 351 obtains from the image attribute information table 26 the image attribute information of each image that satisfies the search condition having been set, and generates the reproduction temporary table 29 for each search condition. Further, when the image attribute information is notified by the image attribute information generator 345, the reproduction information generating/updating unit 351 updates the corresponding reproduction temporary table 29 as necessary.

The search condition selector 353 receives selection operation and deselection operation of a reproduction search condition from a user, and selects the reproduction search condition according to the received selection operation or deselection operation. In the present embodiment, selection operation or deselection operation can be independently performed on the three types of search conditions, serving as reproduction search conditions, set by the search condition setting unit 349. The search condition selector 353 selects these search conditions as the reproduction search conditions in accordance with user operation.

The selected period image list generator 354 receives selection operation of a period from a user, and selects a selected period in accordance with the received selection operation. Then, the selected period image list generator 354 references the image attribute information table 26, obtains the image attribute information of images whose shooting dates are included in the selected period, and generates the selected period image list table 30.

The image display data generator 355, the OSD data generator 357, and the overplay display processing unit 359 serve as a search result reproducing unit, and reproduce reproduction result of the image of interest. As a result of the processings of these units, the image of the image attribute information set in the corresponding reproduction temporary table 29 according to the reproduction search condition is displayed as a reproduction object on the display unit 24. More specifically, the image display data generator 355 references the reproduction temporary table 29 in accordance with the reproduction search condition selected by the search condition selector 353, and generates image display data for displaying a search result screen arranged with thumbnail data of images satisfying the reproduction search condition. The OSD data generator 357 generates OSD (On Screen Display) data including text information for presenting the selected reproduction search condition. The overplay display processing unit 359 performs processing for displaying the image display data generated by the image display data generator 355 and the OSD data generated by the OSD data generator 357 in an overlapping manner.

The image display data generator 355, the OSD data generator 357, and the overplay display processing unit 359 serves as a period reproducing unit, and reproduces images in the selected period, i.e., an example of shooting period. As a result of the processings of these units, the images of the image attribute information set by the selected period image list table 30 are displayed as a reproduction object on the display unit 24. More specifically, the image display data generator 355 references the selected period image list table 30 in accordance with the reproduction search condition selected by the search condition selector 353, and generates image display data for displaying a search result screen arranged with thumbnail data of images in the selected period selected by the selected period image list generator 354. The OSD data generator 357 generates OSD (On Screen Display) data including text information for presenting the selected period. The overplay display processing unit 359 performs processing for displaying the image display data generated by the image display data generator 355 and the OSD data generated by the OSD data generator 357 in an overlapping manner.

Now, the processings of the units of the digital camera 1 thus configured will be described with reference to FIGS. 4 to 13.

Figure 4:
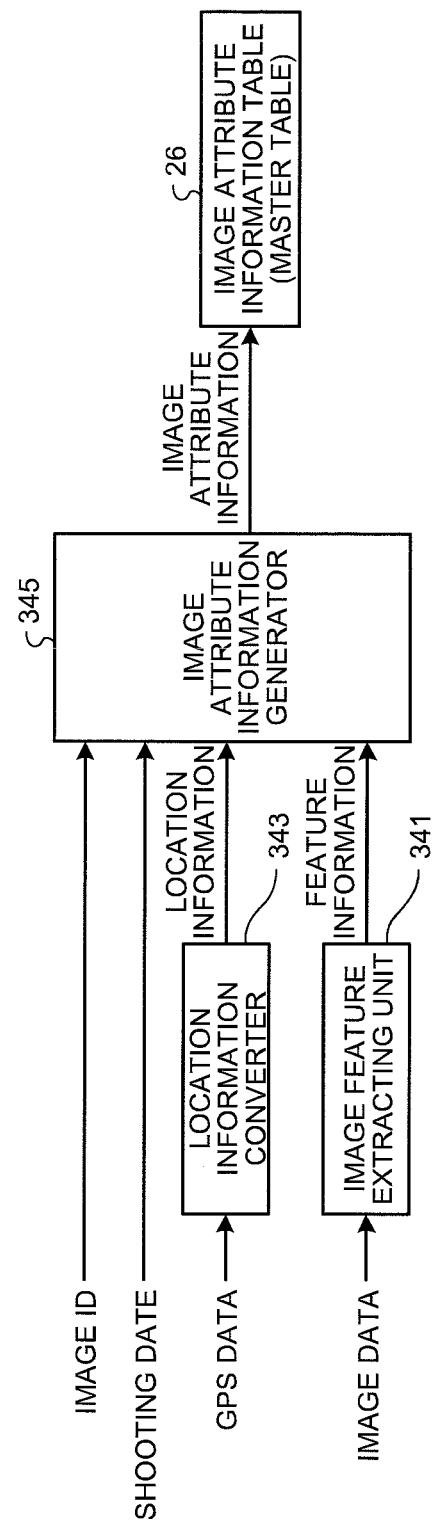
FIG. 4 is an explanatory diagram illustrating processing performed by the units of the digital camera when image attribute information is registered to an image attribute information table.

FIG. 4 is an explanatory diagram illustrating the processing performed by the units of the digital camera 1 when the image attribute information is registered to the image attribute information table 26. This processing is performed on the image file, when image data of the shot image is generated upon a shooting instruction or when the externally-obtained image provided by the external apparatus is obtained.

When the shot image is generated or when the externally-obtained image is obtained, the location information converter 343 uses the GPS data of the image to convert the positional information into location information as illustrated in FIG. 4. For example, a relationship between the range of positional information (latitude, longitude, and altitude) and a geographic name of that positional information is set in advance. Then, the location information converter 343 reads the geographic name corresponding to that positional information on the basis of the GPS data, and converts the positional information into location information.

The image feature extracting unit 341 analyzes the image data of the image to extract feature information. For example, a well-known facial detection processing is performed to feature information. This facial detection processing detects a region of face (facial region) in the image data by, for example, applying a pattern matching, and detects facial parts such as right and left eyes, nose, and lip on the basis of this detection result of the facial region. In the present embodiment, the image feature extracting unit 341 performs this facial detection processing, and detects, for example, the number of detected faces on the basis of the facial detection result. Person number information, i.e., the number of detected faces, is extracted as feature information. More specifically, when there is no person appearing in an image, the person number information is set to "0". When there are persons appearing in an image, the person number information is set to the number of persons appearing in the image. The person number information thus set is output as the feature information.

The above-described person number information is merely an example of the feature information, and the person number information is not limited thereto. For example, the size of face in the image data may be detected on the basis of the facial detection result, and the size of detected face may be used as the feature information. A well-known method may be used to determine (estimate) the gender of the face in the image data on the basis of the facial detection result, and the designated gender may be used as the feature information. Alternatively, a well-known method may be used to determine (estimate) the age on the basis of the facial detection result, and the estimated age may be used as the feature information. Alternatively, a well known-method may be used to determine whether the face is smiling or not on the basis of the facial detection result, and the determination result may be used as the feature information. Alternatively, a face of a particular person may be registered in advance, and a determination as to whether the image data includes the registered face of the particular person may be used as the feature information. In this case, the facial region in the image data is collated with the registered facial image on the basis of the detection result, and a determination is made as to whether the facial region includes the face of the particular person or not. Then, this determination result is used as the feature information. Alternatively, a combination of a plurality of pieces of the above-described information about persons appearing in the image may be used as the feature information.

The feature information is not limited to the information about persons who appear in the image. For example, information about scenery appearing in the image may be used as the feature information. In this case, the image data may be subjected to image processing, and for example, scenery such as mountains, river, ocean, and buildings appearing in the image may be detected and used as the feature information.

As illustrated in FIG. 4, the image attribute information generator 345 generates the image attribute information about the shot image or the externally-obtained image in association with the image ID and the date of shooting of the image, the feature information extracted by the image feature extracting unit 341, and the location information converted by the location information converter 343. The generated image attribute information is registered (additionally recorded) to the image attribute information table (master table) 26. The person information and the location information are examples of attribute values representing attributes of the image.

FIG. 5 shows an example of data structure of the image attribute information table 26. As illustrated in FIG. 5, the image attribute information table 26 is a data table in which the image ID, the person information, the location information, and the shooting date are associated. In the example in FIG. 5, the image attribute information table 26 includes month, and year of the shooting serving as the shooting date, but may include a day of the week and a time as necessary. In this example, the person information is feature information extracted from the image data designated with the image ID by the image feature extracting unit 341 as described above. For example, the image attribute information designated with an image ID "130" of a record R11 represents an image including a person, namely, image attribute information generated by the image attribute information generator 345 about an image (shot image or externally-obtained image) taken in Okinawa on Jul. 30, 2007.

Figure 6:
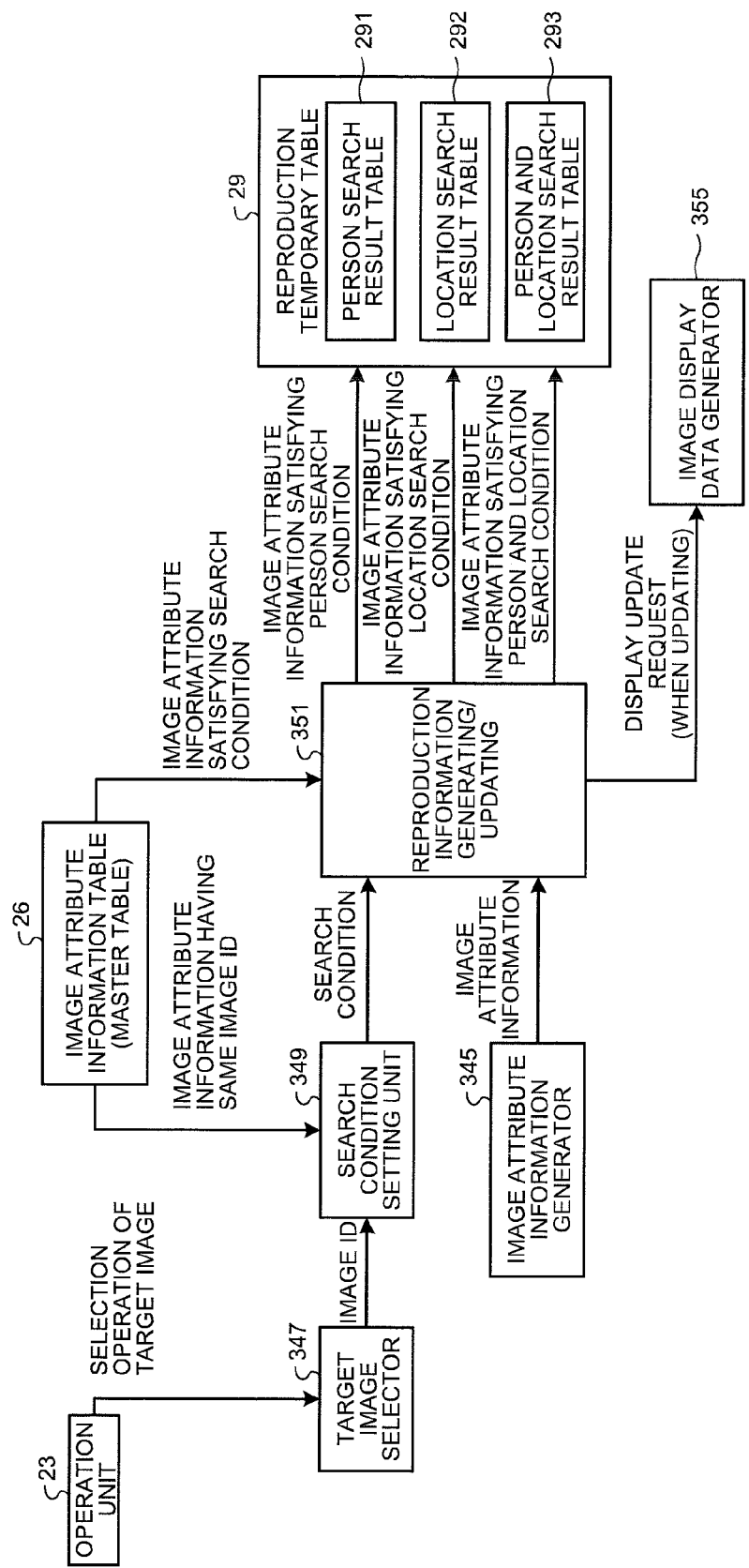
FIG. 6 is an explanatory diagram illustrating processing performed by the unit of the digital camera when a reproduction temporary table is generated.

FIG. 6 is an explanatory diagram illustrating the processing of the unit of the digital camera 1 when the reproduction temporary table 29 is generated. This processing is performed on an image of interest (using the image ID of the image of interest) when selection operation of the image of interest is received in the search mode.

When selection operation of the image of interest is received via the operation unit 23, the target image selector 347 selects the image of interest (specifically, the image ID of the image of interest) in accordance with the selection operation as illustrated in FIG. 6.

Then, the search condition setting unit 349 references the image attribute information table 26, and reads the image attribute information set with the image ID of the image of interest selected by the target image selector 347. Then, the search condition setting unit 349 sets a search condition in accordance with the image attribute information having been read.

In the present embodiment, the search condition setting unit 349 sets a person search condition, a location search condition, and a person and location search condition, on the basis of the person information and the location information of the image attribute information about the image of interest having been read. The person and location search condition is an AND condition of a combination of the person search condition and the location search condition. In this example, the person search condition is set to information indicating whether there is any person or not on the basis of the person information. More specifically, when the person information is set to "0", the person search condition is set to "no person". When the person information is set to a value other than "0", the person search condition is set to "person is present". On the other hand, the location search condition is set to the location information.

For example, when the image designated with the image ID "130" shown in the record R11 of FIG. 5 is selected as a image of interest by the target image selector 347, the search condition setting unit 349 sets the person search condition to "person is present", the location search condition to "Okinawa", the person and location search condition to "person is present and Okinawa".

As illustrated in FIG. 6, the reproduction information generating/updating unit 351 generates the reproduction temporary table 29 for each search condition on the basis of the three types of search conditions, i.e., the person search condition, the location search condition, and the person and location search condition set by the search condition setting unit 349.

More specifically, the reproduction information generating/updating unit 351 references the image attribute information table 26, reads the image attribute information satisfying the person search condition, and generates a person search result table 291, i.e., one of the reproduction temporary tables 29. FIG. 7 shows an example of the person search result table 291. FIG. 7 illustrates the person search result table 291 that is generated when the person search condition is set to "person is present". When the person search condition is set to "person is present", the reproduction information generating/updating unit 351 reads from the image attribute information table 26 all the image attribute information in which the person information is set to a value other than "0", as the image attribute information satisfying the person search condition. Further, the reproduction information generating/updating unit 351 generates the person search result table 291, an example of which is illustrated in FIG. 7, including the image attribute information having been read.

The reproduction information generating/updating unit 351 references the image attribute information table 26, reads the image attribute information satisfying the location search information, and generates a location search result table 292, i.e., one of the reproduction temporary tables 29. FIG. 8 shows an example of the location search result table 292 (292-1). FIG. 9 shows another example of the location search result table 292 (292-2). In this example, FIG. 8 illustrates the location search result table 292-1 generated when the location search condition is set to "Okinawa" on the basis of the image attribute information table 26 of FIG. 5. FIG. 9 illustrates the location search result table 292-2 generated when the location search condition is set to "Tokyo" on the basis of the image attribute information table 26 of FIG. 5. For example, when the location search condition is set to "Okinawa", the reproduction information generating/updating unit 351 reads from the image attribute information table 26 all the image attribute information including the location information set to "Okinawa", as the image attribute information satisfying the location search condition. Then, the reproduction information generating/updating unit 351 generates the location search result table 292-1, an example of which is illustrated in FIG. 8, including the image attribute information having been read.

The reproduction information generating/updating unit 351 selects image attribute information satisfying the person search condition and satisfying the location search condition from among the image attribute information satisfying the person search condition or satisfying the location search condition. Then, the reproduction information generating/updating unit 351 generates a person and location search result table 293, i.e. one of the reproduction temporary tables 29. FIG. 10 shows an example of the person and location search result table 293. FIG. 10 illustrates the person and location search result table 293 generated when the person search condition is set to "person is present" and the location search condition is set to "Okinawa". For example, when the person and location search result condition is set to "person is present and Okinawa", the reproduction information generating/updating unit 351 selects the image attribute information including the location information set to "Okinawa", as the image attribute information satisfying the person and location search condition, from among the image attribute information read from the image attribute information table 26 on the basis of the above-described person search condition "person is present". Then, the reproduction information generating/updating unit 351 generates the person and location search result table 293 including the selected image attribute information having been set.

As illustrated in FIG. 6, the reproduction information generating/updating unit 351 records the person search result table 291, the location search result table 292, and the person and location search result table 293 to the reproduction temporary tables 29 in the temporary recording unit 28.

Further, when a shot image is generated in the search mode, the reproduction information generating/updating unit 351 updates the reproduction temporary tables 29 on the basis of the generated image attribute information of the shot image. This is because there may be a case where the reproduction temporary tables 29 is generated before a shooting instruction is given, immediately thereafter the mode is switched to the search mode right, an image of interest is selected, image data of the shot image is generated, and an image file 270 is recorded. Further, when a connection is established with the external apparatus via the communication unit 32 in the search mode, and an externally-obtained image is obtained from this external apparatus, the reproduction information generating/updating unit 351 updates the reproduction temporary table 29 on the basis of the image attribute information of the externally-obtained image.

In other words, the reproduction information generating/updating unit 351 determines, on the basis of the image attribute information generated by the image attribute information generator 345 at an applicable time, whether the person information and the location information set in this image attribute information satisfy the person search condition and the location search information. When the person information satisfies the person search condition, the reproduction information generating/updating unit 351 adds the image attribute information thereof to the person search result table 291. When the location information satisfies the location search condition, the reproduction information generating/updating unit 351 adds the image attribute information thereof to the location search result table 292. When the person information satisfies the person search condition and the location information satisfies the location search condition, the reproduction information generating/updating unit 351 adds the image attribute information thereof to the person and location search result table 293.

When the reproduction temporary table 29 is updated as described above, the reproduction information generating/updating unit 351 notifies a display update request to the image display data generator 355.

Figure 11:
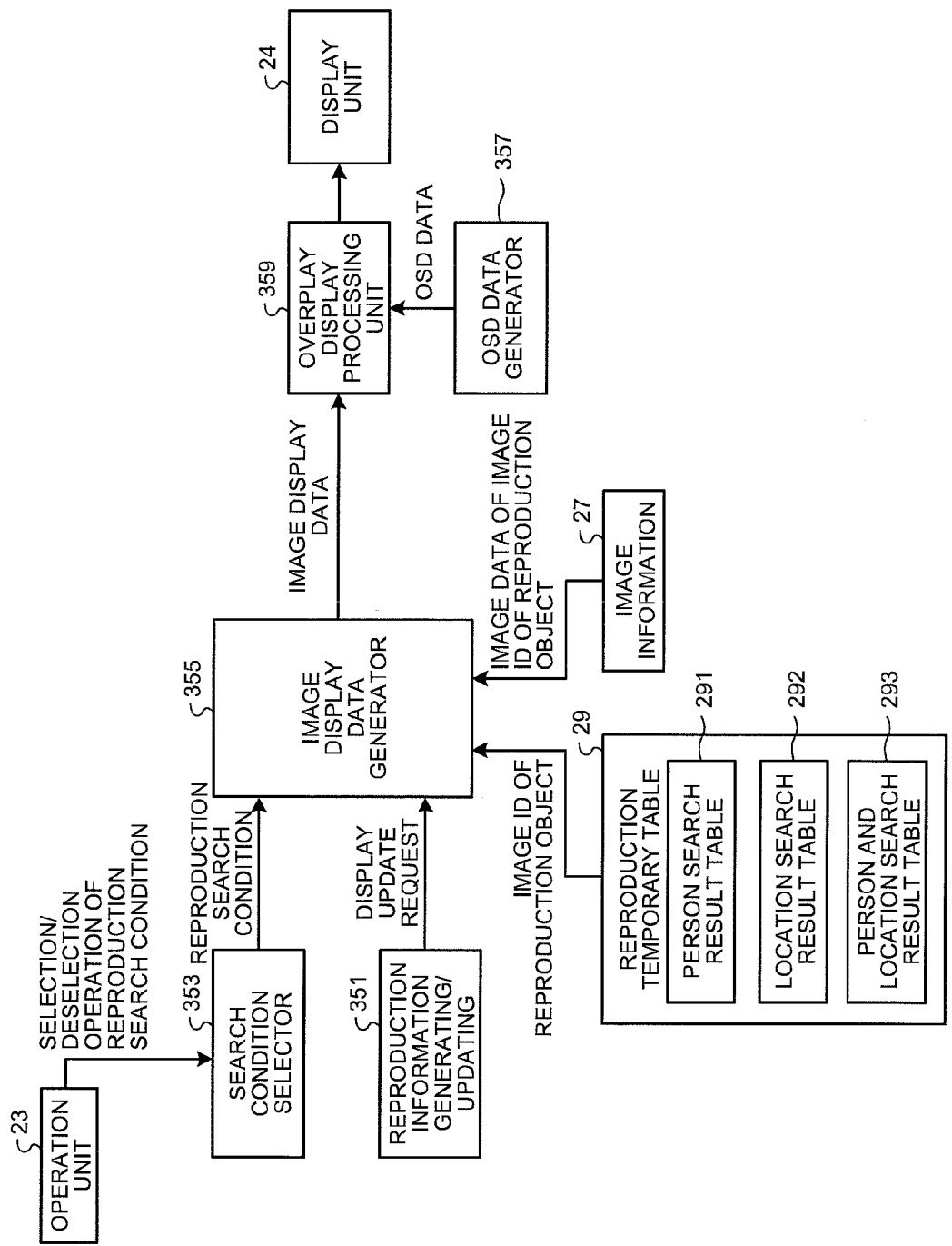
FIG. 11 is an explanatory diagram for illustrating processing performed by the units when a search result is reproduced upon referencing the reproduction temporary table.

FIG. 11 is an explanatory diagram for illustrating the processing performed by the units when a search result is reproduced upon referencing the reproduction temporary table 29. This processing is performed when selection operation of an image of interest is received in the search mode and thereafter selection operation or deselection operation of a reproduction search condition is received from a user or when the reproduction information generating/updating unit 351 notifies a display update request to the image display data generator 355.

When selection operation or deselection operation of a reproduction search condition is received via the operation unit 23, the search condition selector 353 selects the reproduction search condition in accordance with the selection operation or the deselection operation as illustrated in FIG. 11.

The user operation will be described later. When the person search switch 9 is pressed down, the search condition selector 353 selects a person search condition as a reproduction search condition. When the person search switch 9 is pressed down again, the person search condition is deselected. Likewise, when the location search switch 10 is pressed down, the search condition selector 353 selects a location search condition as a reproduction search condition. When the location search switch 10 is pressed down again, the location search condition is deselected.

When the location search switch 10 is pressed down while the person search condition is selected as the reproduction search condition, the search condition selector 353 selects a person and location search condition as the reproduction search condition. When the person search switch 9 is pressed down while the location search condition is selected as the reproduction search condition, the search condition selector 353 selects a person and location search condition as the reproduction search condition.

When the person search switch 9 is pressed down while the person and location search condition is selected as the reproduction search condition, the search condition selector 353 deselects the person search condition (the reproduction search condition is the location search condition). When the location search switch 10 is pressed down while the person and location search condition is selected as the reproduction search condition, the search condition selector 353 deselects the location search condition (the reproduction search condition is the person search condition).

When the person search switch 9 is pressed down while the person search condition is selected as the reproduction search condition, the search condition selector 353 deselects the person search condition. When the location search switch 10 is pressed down while the location search condition is selected as the reproduction search condition, the search condition selector 353 deselects the location search condition. Therefore, all the search conditions, i.e., the person search condition, the location search condition, and person and location search condition, are deselected as the reproduction search condition. In this case, images whose image attribute information is registered in the image attribute information table 26 (i.e., all the images recorded as the image files 270 in the recording unit 25) are reproduced.

When the search condition selector 353 selects the reproduction search condition as described above, the image display data generator 355 generates image display data in accordance with the selected reproduction search condition. More specifically, the image display data generator 355 identifies the reproduction temporary table 29 to be referenced (i.e., the person search result table 291, the location search result table 292, or the person and location search result table 293) on the basis of the reproduction search condition, and reads the image of a reproduction object. Then, the image display data generator 355 reads the thumbnail data 279 from the image file 270 corresponding to the image information 27, on the basis of the image ID of the reproduction object having been read. Then, the image display data generator 355 generates image display data including thumbnails of the reproduction objects arranged side by side.

On the other hand, the OSD data generator 357 generates OSD data including text information arranged at a predetermined position for presenting the reproduction search condition selected by the search condition selector 353.

Then, the overplay display processing unit 359 performs processing for displaying the OSD data generated by the OSD data generator 357 overlappingly on the image display data generated by the image display data generator 355, and displays the OSD data and the image display data as a search result screen on the display unit 24 in an overlapping manner.

For example, when the person search condition is selected as the reproduction search condition, the person search result table 291 is identified as a table to be referenced. Then, the image ID of the image attribute information set in this person search result table 291 is adopted as the image ID of the reproduction object, and the image information 27 is referenced, so that image display data including thumbnails thereof arranged side by side is generated. Further, the OSD data including the content of the person search condition represented as text is generated. Then, these are displayed on the display unit 24 in an overlapping manner. Consequently, images satisfying the person search condition are displayed as thumbnails, and the search result screen presenting the content of the person search condition is displayed on the display unit 24. In this way, the person search result is reproduced.

When the location search condition is selected as the reproduction search condition, the location search result table 292 is identified as a table to be referenced. Then, the image ID of the image attribute information set in this location search result table 292 is adopted as the image ID of the reproduction object, and the image information 27 is referenced, so that image display data including thumbnails thereof arranged side by side is generated. Further, the OSD data including the content of the location search condition represented as text is generated. Then, these are displayed on the display unit 24 in an overlapping manner. Consequently, images satisfying the location search condition are displayed as thumbnails, and the search result screen presenting the content of the location search condition is displayed on the display unit 24. In this way, the location search result is reproduced.

When the person and location search condition is selected as the reproduction search condition, the person and location search result table 293 is identified as a table to be referenced. Then, the image ID of the image attribute information set in this person and location search result table 293 is adopted as the image ID of the reproduction object, and the image information 27 is referenced, so that image display data including thumbnails thereof arranged side by side is generated. Further, the OSD data including the content of the person and location search condition represented as text is generated. These are displayed on the display unit 24 in an overlapping manner. Consequently, images satisfying the person and location search condition are displayed as thumbnails, and the search result screen presenting the content of the person and location search condition is displayed on the display unit 24. In this way, the person and location search result is reproduced.

Further, when a display update request is notified from the reproduction information generating/updating unit 351, the image display data generator 355 generates image display data again. In this case, the image display data generator 355 reads the image ID of the reproduction object from the reproduction temporary table 29 in accordance with the reproduction search condition selected at this moment. Then, the image display data generator 355 reads the thumbnail data 279 from the image file 270 corresponding to the image information 27, on the basis of the image ID of the reproduction object having been read. Then, the image display data generator 355 generates image display data including thumbnails of images of the reproduction object, which are arranged side by side.

When the image display data generator 355 generates image display data again as described above, the overplay display processing unit 359 uses the image display data generated by the image display data generator 355 to perform processing for updating and displaying a search result screen displayed on the display unit 24. As a result of the above processing, when the reproduction temporary table 29 is updated in accordance with the selected reproduction search condition due to either image shooting with the function of the digital camera 1 or image acquisition from the external apparatus, the search result is reproduced again with this reproduction temporary table 29 having been updated.

Figure 12:
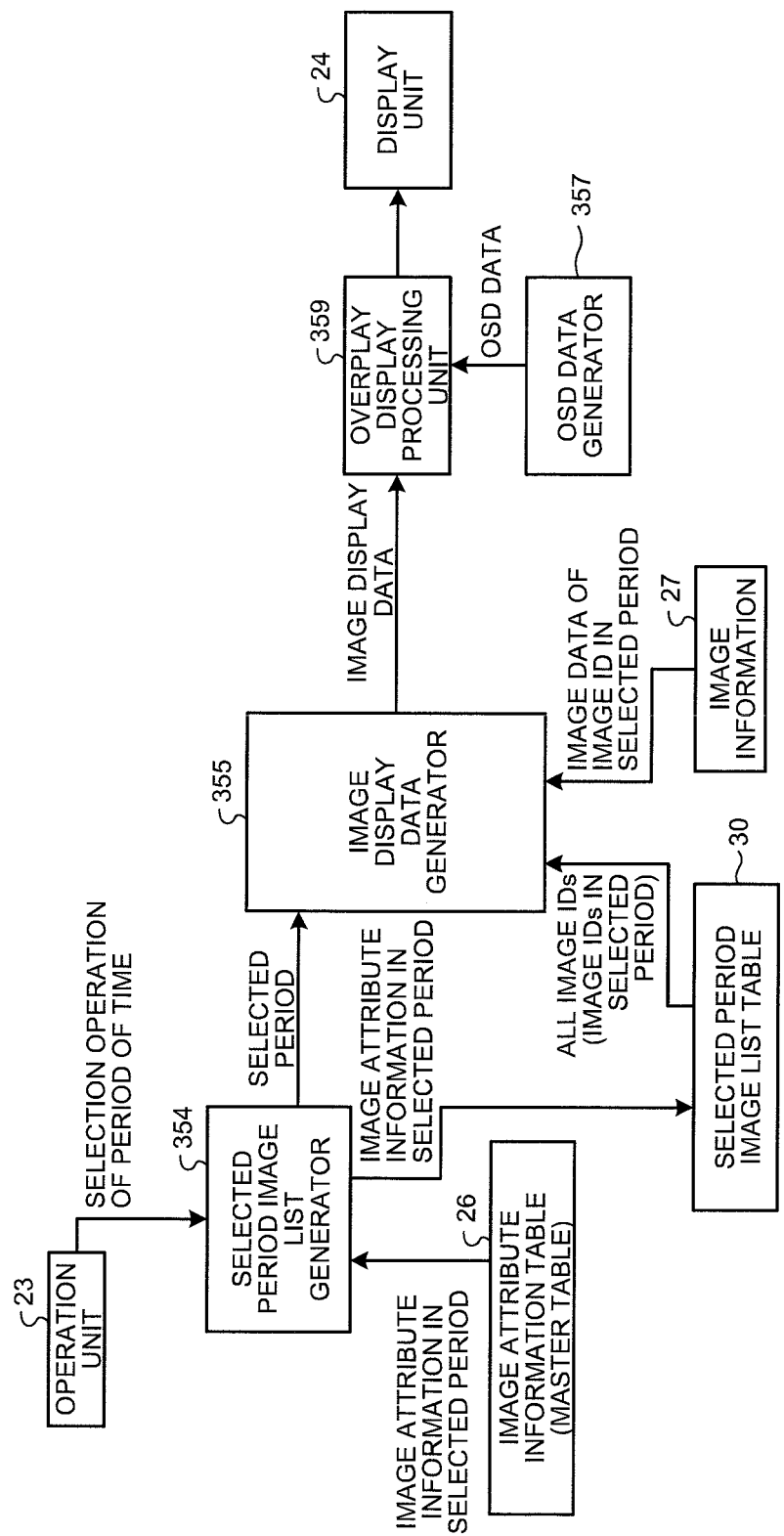
FIG. 12 is an explanatory diagram illustrating processing performed by the units of the digital camera when a selected period image list table is generated.

FIG. 12 is an explanatory diagram illustrating the processing performed by the units of the digital camera 1 when the selected period image list table 30 is generated. This processing is performed when selection operation of a period of time is received in the search mode.

When selection operation of a period is received via the operation unit 23, the selected period image list generator 354 sets a selected period by selecting the oldest shooting date and the latest shooting date on the basis of shooting dates of images currently displayed as thumbnails on a search result display screen.

The user operation will be described later. The selected period image list generator 354 sets the selected period when the period selection switch 11 is pressed down.

Subsequently, the selected period image list generator 354 references the image attribute information table 26, and reads image attribute information whose shooting dates are included in the selected period. Then, the selected period image list generator 354 generates the selected period image list table 30 including image attribute information having been read, and records the selected period image list table 30 to the temporary recording unit 28.

Figure 13:
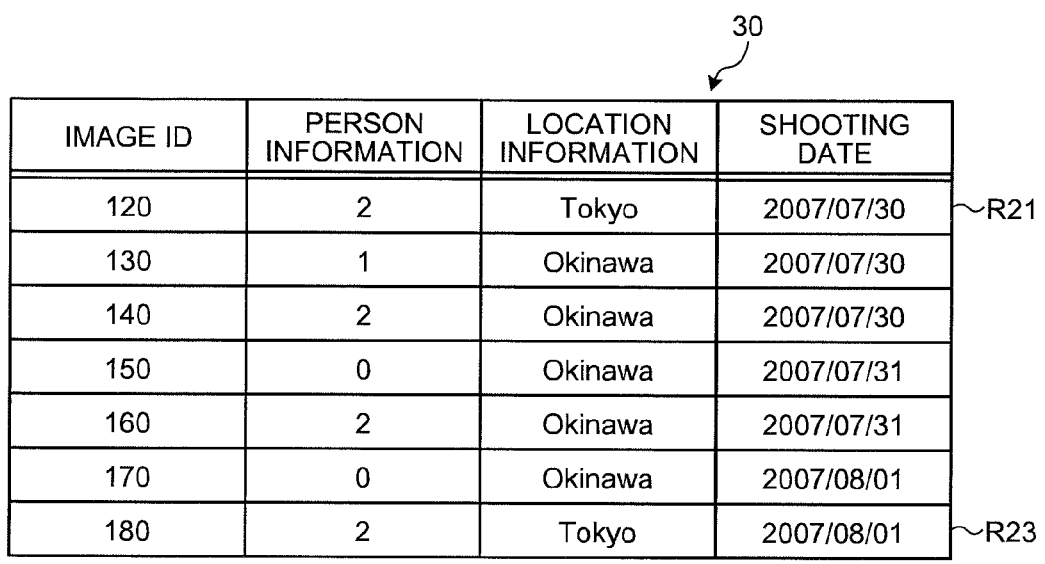
FIG. 13 shows an example of the selected period image list table.

FIG. 13 shows an example of the selected period image list table 30. FIG. 13 illustrates an example of the selected period image list table 30 generated when a user presses down the period selection switch 11, while the location search condition is selected as the reproduction search condition, and the search result screen made by referencing the location search result table 292-1 as illustrated in FIG. 8 is displayed on the display unit 24. In this case, the selected period image list generator 354 sets a shooting period "Jul. 30, 2007 to Aug. 1, 2007", on the basis of the oldest shooting date, Jul. 30, 2007, and the latest shooting date, Aug. 1, 2007, in the location search result table 292-1 as illustrated in FIG. 8. Then, the selected period image list generator 354 reads from the image attribute information table 26 the image attribute information whose shooting dates are included in the selected period, and generates the selected period image list table 30, an example of which is illustrated in FIG. 13, including the image attribute information having been read.

Consequently, the selected period image list table 30 is generated by adding the image attribute information of the location search result table 292-1 with the image attribute information of records R21 and R23. In this example, five images whose location information indicates "Okinawa" are images taken during a trip to Okinawa. In this case, an image taken in Tokyo on Jul. 30, 2007, as indicated by the image attribute information of the record R21, and an image taken in Tokyo on Aug. 1, 2007, as indicated by the image attribute information of the record R23, are likely to be taken at a station or in a car on the way to Okinawa, at an airport or in an airplane. In such case, these images taken in Tokyo have a relation with five images taken in Okinawa. In this way, for example, a selected period is set on the basis of the search result of the location search condition, images whose shooting dates are included in the selected period are newly read from the image attribute information table 26, and the selected period image list table 30 is generated. Therefore, it is possible to display related images that are less likely to be included in the search result obtained with the person search condition and the location search condition.

Further, as illustrated in FIG. 12, the image display data generator 355 adopts the image IDs of all of the image attribute information set in the selected period image list table 30 as the image IDs of the reproduction objects, and referencing the image information 27, thus generating image display data including thumbnails thereof arranged side by side. Further, the OSD data including the content of the selected period represented as text is generated. These are displayed on the display unit 24 in an overlapping manner. Consequently, images whose shooting dates are included in the selected period are displayed as thumbnails, and the search result screen presenting the content of the selected period is displayed on the display unit 24.

Figure 14:
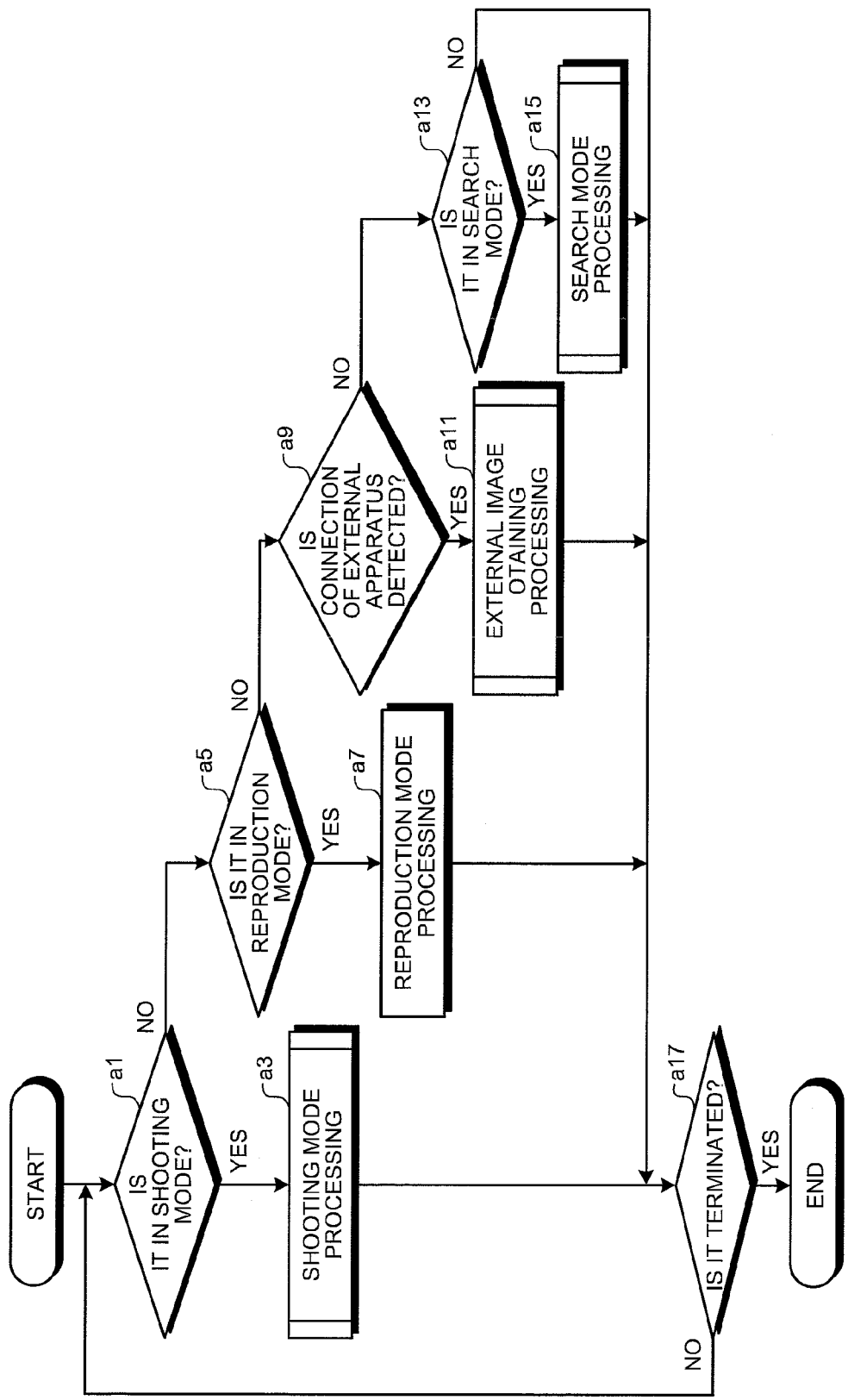
FIG. 14 is a flowchart illustrating the procedure of the basic processing performed by the digital camera.

Subsequently, the procedure of processing performed by the digital camera 1 will be described. FIG. 14 is a flowchart illustrating the procedure of the basic processing performed by the digital camera 1. As illustrated in FIG. 14, when a users slides the mode selector switch 6 at a time of power-on so as to change the operational mode of the digital camera 1 to a shooting mode (step a1: Yes), the program proceeds to the shooting mode processing (step a3). On the other hand, when the operational mode is changed to the reproduction mode by the mode selector switch 6 (step a5: Yes), the program proceeds to the reproduction mode processing (step a7). In this reproduction mode processing, for example, the processing unit 34 performs processing for reproducing and displaying on the display unit 24 the image data 277 in the image file 270 recorded in the recording unit 25. When a connection with the external apparatus via the communication unit 32 is detected (step a9: Yes), the program proceeds to external image obtaining processing (step a11). When the INFO switch 8 is pressed down, and the operational mode is switched to the search mode (step a13: Yes), the program proceeds to search mode processing (step a15).

In step a11, a determination is made as to whether the basic processing is to be terminated or not. For example, when the power switch 3 is pressed down, and power-off is instructed, this processing is terminated (step a17: Yes). On the other hand, when the basic processing is not to be terminated (step a17: No), the program returns back to step a1.

Figure 15:
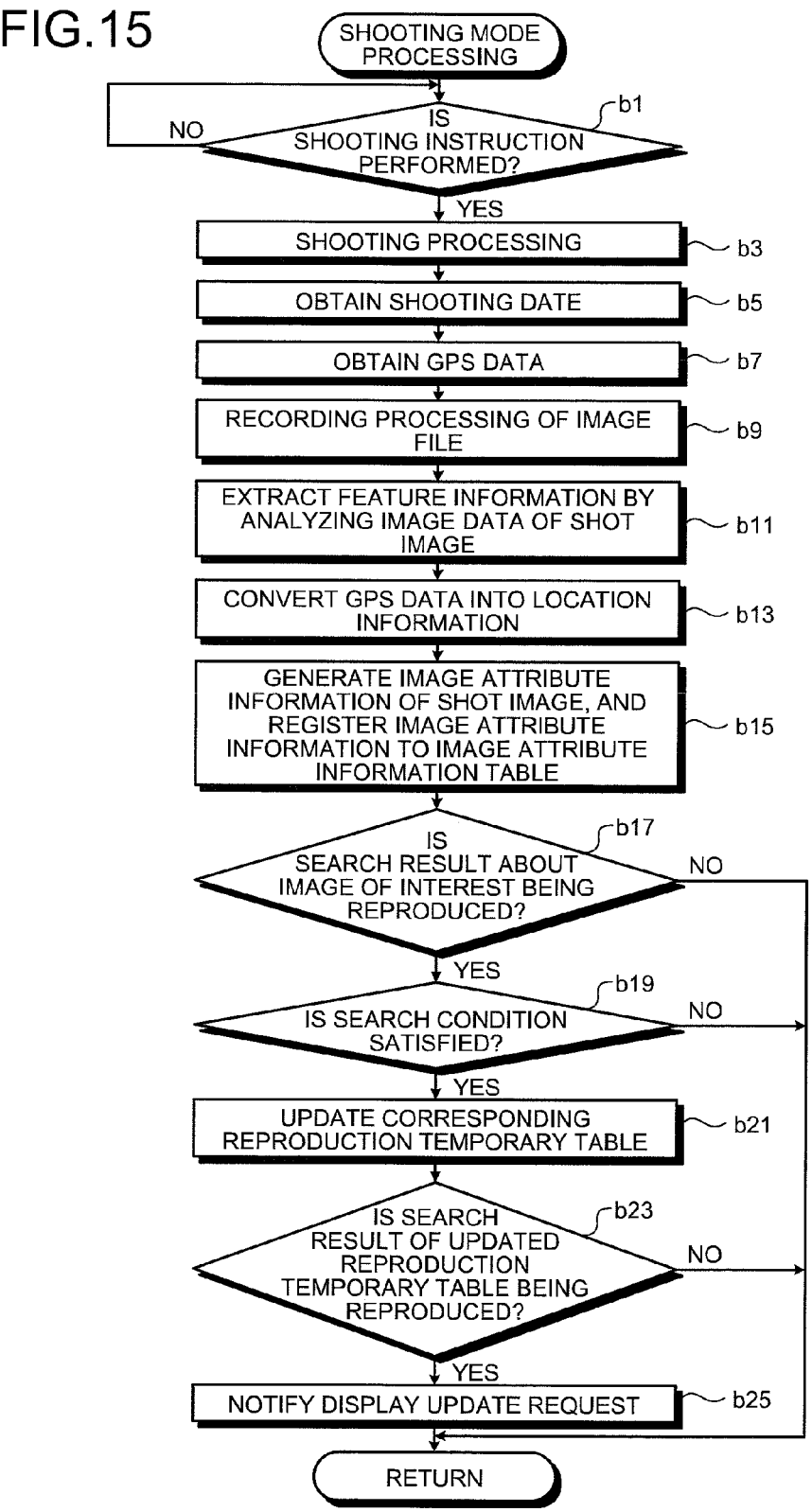
FIG. 15 is a flowchart illustrating the procedure of processing of a shooting mode processing.

The shooting mode processing of step a3, the external image obtaining processing of step a11, and the search mode processing of step a15 will be hereinafter described. FIG. 15 is a flowchart illustrating the procedure of processing of the shooting mode processing.

In this example, in the shooting mode processing, live view images are repeatedly displayed on the display unit 24. As illustrated in FIG. 15, when the release switch 4 is pressed down, and a shooting instruction is given (step b1: Yes), the processing unit 34 drives the imaging unit 21 to perform shooting processing (step b3). As a result of this processing, image data in a shooting range at a time of the pressing of the release switch 4 is generated as image data of shot images. At this moment, the image processing unit 22 performs, e.g., compression processing on the image data of the shot image for recording and reduction processing of the shot image to generate thumbnail data.

Subsequently, the program proceeds to step b5. When selection operation of, for example, the reproduction mode and the search mode is input to the digital camera 1, the processing of step b5 and subsequent steps are performed in parallel with the processing performed in response to the above various operational inputs. In other words, for example, when the INFO switch 8 is pressed down during execution of the processing of step b5 and subsequent steps, and the operational mode of the digital camera 1 is switched to the search mode, the later-described search mode processing is performed with reference to FIGS. 17 to 19 in parallel with the processing of step b5 and subsequent steps.

In step b5, the processing unit 34 obtains the current time measured by the clock unit 31 as a shooting date. Subsequently, the processing unit 34 obtains the GPS data at the current position calculated by the GPS receiving unit 33 (step b7). Then, the processing unit 34 assigns an image ID to a shot image, and performs processing for recording image-processed image data and thumbnail data thereof, together with the obtained current time and the GPS data, to the recording unit 25 as an image file 270 (step b9).

Subsequently, the image feature extracting unit 341 analyzes the image data of the shot image, and extracts feature information (step b11). In the present embodiment, the image feature extracting unit 341 detects a facial region from the shot image by performing face detection processing. On this basis of the detection result of the facial region, the image feature extracting unit 341 detects whether the shot image includes a face or not. When the shot image includes a face, the image feature extracting unit 341 detects the number of faces. Thus, the image feature extracting unit 341 extracts person information as feature information. Further, the location information converter 343 converts the GPS data of the shot image into location information (step b13). Then, the image attribute information generator 345 generates image attribute information by associating the shooting date obtained in step b5, the image ID assigned to the shot image in step b9, the feature information extracted in step b11, and the location information converted in step b13. Then, the image attribute information generator 345 registers the image attribute information to the image attribute information table 26 (step b15).

After the image attribute information is registered, the reproduction information generating/updating unit 351 subsequently determines whether the current operational mode is the search mode and the search result of an image of interest is now being reproduced. More specifically, the reproduction information generating/updating unit 351 determines that the search result is now being reproduced if the reproduction temporary table 29 is generated (step b17: Yes), and determines whether the person information and the location information of the image attribute information newly registered in step b15 satisfy the search result thereof. More specifically, the reproduction information generating/updating unit 351 determines whether the person information and the location information satisfy the search result by determining whether the person information and/or the location information of the registered image attribute information are respectively the same as the person information and/or the location information of the image of interest. When the person information and the location information are determined to satisfy the search result (step b19: Yes), the reproduction information generating/updating unit 351 updates a corresponding reproduction temporary table (the person search result table 291, the location search result table 292, or the person and location search result table 293) (step b21).

Subsequently, the reproduction information generating/updating unit 351 determines whether the search result of the updated reproduction temporary table 29 is now being reproduced, on the basis of the currently selected reproduction search condition. For example, the reproduction information generating/updating unit 351 makes a determination by determining the reproduction temporary table 29 of the currently selected reproduction search condition has been updated or not. When the updated reproduction temporary table 29 is determined to be now being reproduced (step b23: Yes), the reproduction information generating/updating unit 351 notifies a display update request to the image display data generator 355 (step b25). In response, in step d63 of the later-described search mode processing with reference to FIG. 19, the search result screen is updated and displayed. Thereafter, the program returns back to step a3 of FIG. 14, and the program proceeds to step a17.

Figure 16:
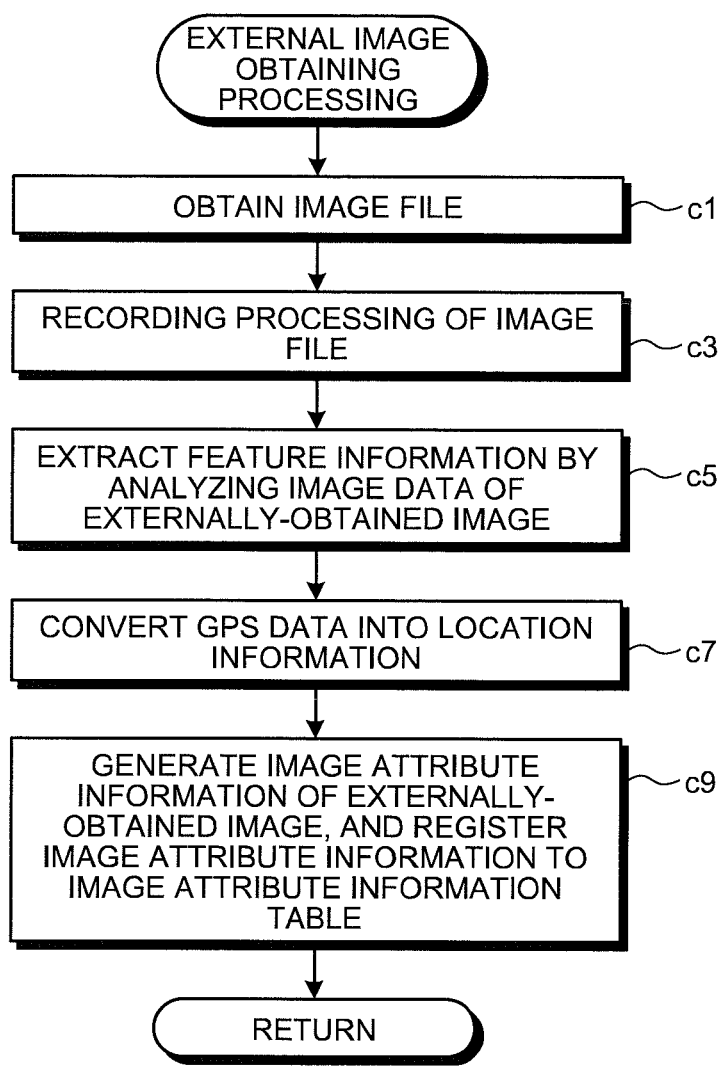
FIG. 16 is a flowchart illustrating the procedure of processing of an external image obtaining processing.

FIG. 16 is a flowchart illustrating the procedure of processing of the external image obtaining processing. When the digital camera 1 is connected to the external apparatus via the communication unit 32, the processing unit 34 obtains the image file of the externally-obtained image from the external apparatus via the communication unit 32 as illustrated in FIG. 16 (step c1). The obtained image file of the externally-obtained image is recorded to the recording unit 25 as the image file 270 (step c3).

Subsequently, the image feature extracting unit 341 analyzes the obtained image data of the externally-obtained image, and extracts feature information (step c5). Further, the location information converter 343 converts the GPS data of the externally-obtained image into location information (step c7). Then, the image attribute information generator 345 generates image attribute information by associating the feature information extracted in step c5, the location information converted in step c7, and the image ID and the shooting date set in the image file of the externally-obtained image obtained in step c1. The image attribute information generator 345 registers the generated image attribute information to the image attribute information table 26 (step c9). Thereafter, the program returns to step a11 of FIG. 14, and the program proceeds to step a17.

Figure 17:
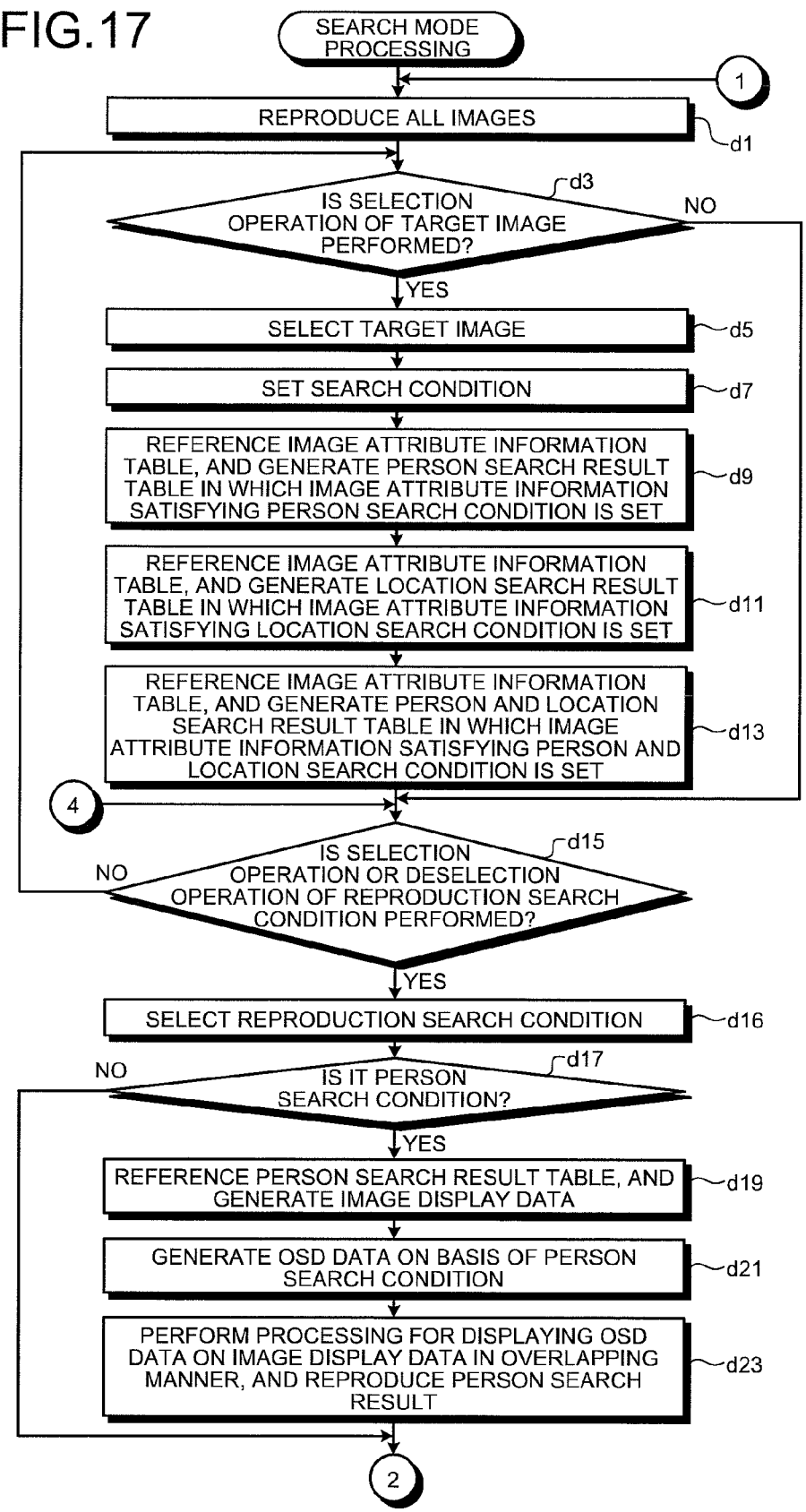
FIG. 17 is a flowchart illustrating the procedure of processing of a search mode processing.
Figure 18:
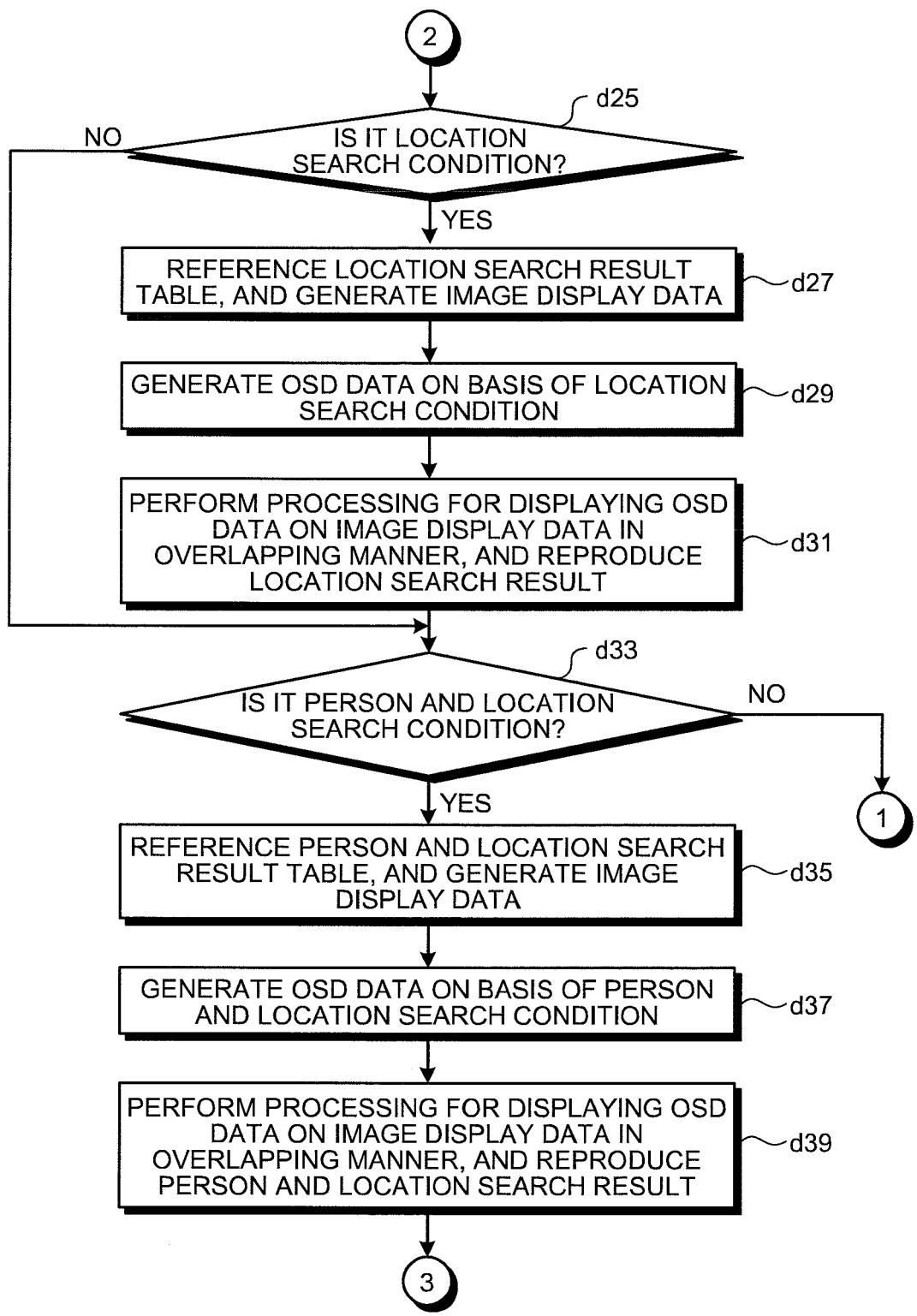
FIG. 18 is a flowchart illustrating the procedure of processing of a search mode processing subsequent to FIG. 17.
Figure 19:
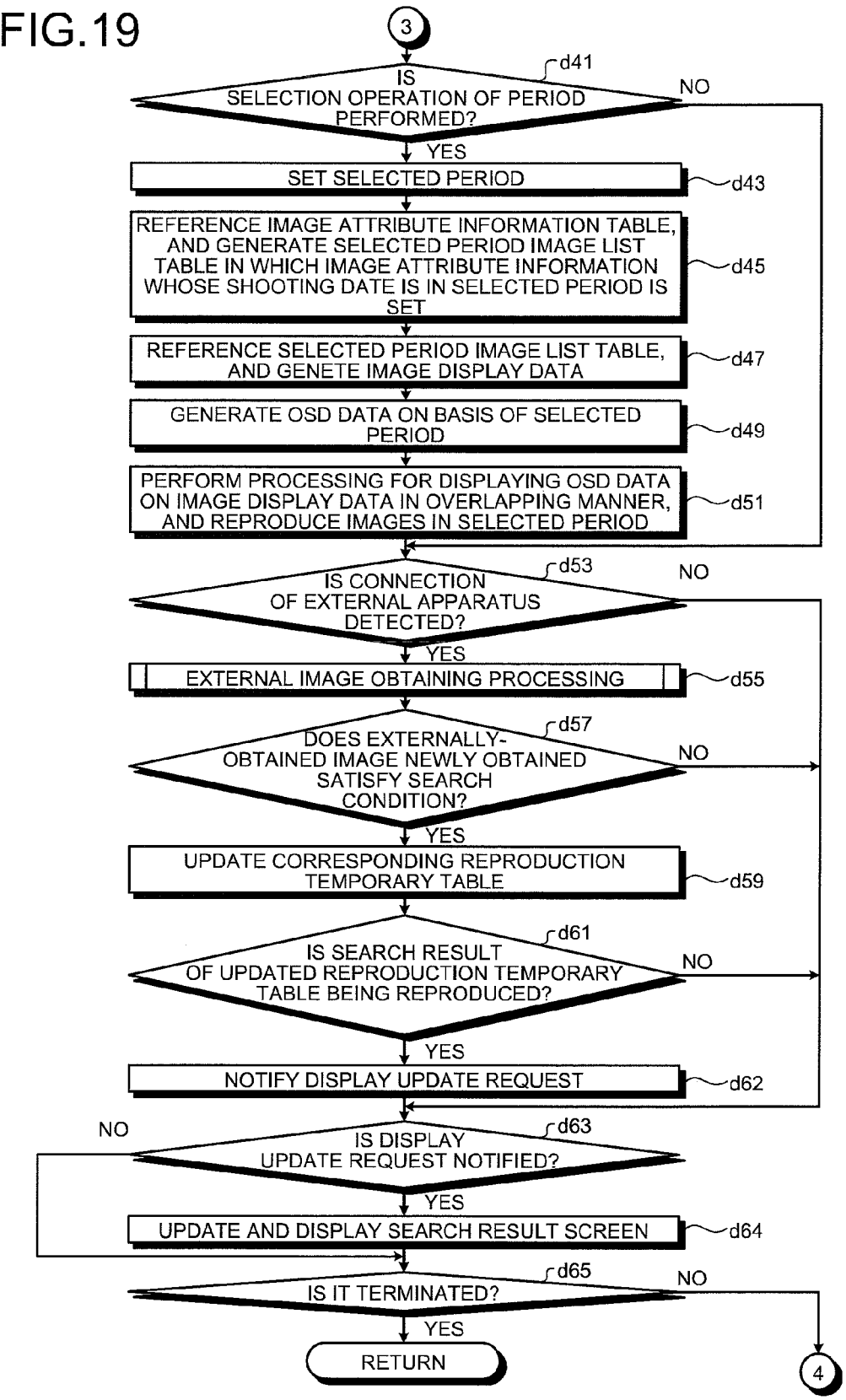
FIG. 19 is a flowchart illustrating the procedure of processing of a search mode processing subsequent to FIG. 18.

FIGS. 17 to 19 are flowcharts illustrating the procedure of processing of the search mode processing. As illustrated in FIG. 17, in the search mode processing, a search result screen is firstly displayed on the display unit 24. The search result screen includes the reproduction objects, i.e., all the images whose image attribute information is registered to the image attribute information table 26 (step d1). More specifically, firstly, the image display data generator 355 reads the reproduction objects, i.e., all the image IDs set in the image attribute information table 26. The image display data generator 355 reads the thumbnail data 279 from the image file 270 corresponding to the image information 27, on the basis of the images IDs of the reproduction objects. Then, the image display data generator 355 generates image display data including the thumbnails of the reproduction objects arranged side by side. The OSD data generator 357 generates OSD data in which the reproduction search condition is left vacant. The overplay display processing unit 359 performs processing for displaying the OSD data on the image display data in an overlapping manner, and displays the OSD data and the image display data as the search result screen on the display unit 24.

Subsequently, the target image selector 347 receives selection operation of an image of interest. When selection operation is received (step d3: Yes), the target image selector 347 selects the image of interest in accordance with the selection operation of the image of interest (step d5). Subsequently, the search condition setting unit 349 sets a search condition on the basis of the person information and the location information of the interest (step d7).

Then, the reproduction information generating/updating unit 351 references the image attribute information table 26, and generates the person search result table 291 including the image attribute information satisfying the person search condition (step d9). The reproduction information generating/updating unit 351 references the image attribute information table 26, and generates the location search result table 292 including the image attribute information satisfying the location search condition (step d11). The reproduction information generating/updating unit 351 references the image attribute information table 26, and generates the person and location search result table 293 including the image attribute information satisfying the person and location search information (step d13).

Subsequently, the search condition selector 353 receives selection operation/deselection operation of the reproduction search condition. When selection operation/deselection operation is received (step d15: Yes), the search condition selector 353 selects the reproduction search condition in accordance with the selection operation/deselection operation of the reproduction search condition (step d16).

Then, the processing is branched in accordance with the reproduction search condition selected in step d16. More specifically, when the person search condition is selected as the reproduction search condition (step d17: Yes), the image display data generator 355 references the person search result table 291, and generates image display data (step d19). The OSD data generator 357 generates OSD data including the content of the person search condition represented as text (step d21). Then, the overplay display processing unit 359 performs processing for overlay display of the OSD data generated in step d21 on the image display data generated in step d19, and displays the search result screen on the display unit 24 (step d23). In this way, the person search result of the image of interest is reproduced.

As illustrated in FIG. 18, when the location search condition is selected as the reproduction search condition in step d16 of FIG. 17 (step d25: Yes), the image display data generator 355 references the location search result table 292, and generates image display data (step d27). The OSD data generator 357 generates OSD data including the content of the location search condition represented as text (step d29). Then, the overplay display processing unit 359 performs processing for overlay display of the OSD data generated in step d29 on the image display data generated in step d27, and displays the search result screen on the display unit 24 (step d31). In this way, the location search result of the image of interest is reproduced.

Alternatively, when the person and location search condition is selected as the reproduction search condition in step d16 of FIG. 17 (step d33: Yes), the image display data generator 355 references the person and location search result table 293, and generates image display data (step d35). The OSD data generator 357 generates OSD data including the content of the person and location search condition represented as text (step d37). Then, the overplay display processing unit 359 performs processing for overlay display of the OSD data generated in step d37 on the image display data generated in step d35, and displays the search result screen on the display unit 24 (step d39). In this way, the person and location search result of the image of interest is reproduced.

Alternatively, when the reproduction search condition is deselected in step d16 of FIG. 17, namely, when the reproduction search condition is neither the person search condition (step d17 of FIG. 17: No), the location search condition (step d25 of FIG. 18: No), nor the person and location search condition (step d33: No), the processing returns back to step d1 of FIG. 17. Consequently, the search result showing all of the images as the reproduction object is displayed on the display unit 24.

Further, as illustrated in FIG. 19, while the person search result, the location search result, or the person and location search result of the image of interest is reproduced, the selected period image list generator 354 receives selection operation of a period. When selection operation is received (step d41: Yes), the selected period image list generator 354 sets a selected period on the basis of the image ID currently designated as the reproduction object (i.e., the image set in the reproduction temporary table 29 in accordance with the selected reproduction search condition) (step d43). Then, the selected period image list generator 354 references the image attribute information table 26, and generates a selected period image list table 30 including image attribute information whose shooting dates are included in the selected period (step d45).

Then, the image display data generator 355 references the selected period image list table 30, and generates image display data (step d47). The OSD data generator 357 generates OSD data including the content of the selected period represented as text (step d49). Then, the overplay display processing unit 359 performs processing for overlay display of the OSD data generated in step d49 on the image display data generated in step d47, and displays the search result screen on the display unit 24 (step d51). In this way, the images in the selected period are reproduced.

When the digital camera 1 connects to the external apparatus via the communication unit 32 while the search result of the image of interest is reproduced (step d53: Yes), the program proceeds to the external image obtaining processing (step d55). This external image obtaining processing is achieved according to the same procedure of processing as the external image obtaining processing illustrated in FIG. 16.

Subsequently, the reproduction information generating/updating unit 351 determines whether the person information and the location information of the image attribute information newly registered in step d55 satisfy the search condition. When the search condition is satisfied (step d57: Yes), the reproduction information generating/updating unit 351 updates a corresponding reproduction temporary table (i.e., the person search result table 291, the location search result table 292, or the person and location search result table 293) (step d59).

Subsequently, the reproduction information generating/updating unit 351 determines the search result of the updated reproduction temporary table 29 is now being reproduced or not, on the basis of the reproduction search condition currently selected. For example, the reproduction information generating/updating unit 351 makes a determination by determining the reproduction temporary table 29 of the currently selected reproduction search condition has been updated or not. When the updated reproduction temporary table 29 is determined to be now being reproduced (step d61: Yes), the reproduction information generating/updating unit 351 notifies a display update request to the image display data generator 355 (step d62).

In the present embodiment, the display update request may be notified in this step d62. In addition, a display update request may be notified to the image display data generator 355 during the shooting mode processing, as described in the processing of step b25 in the shooting mode processing of FIG. 15. Therefore, in the search mode processing, a notification of display update request is monitored in subsequent step d63. When the display update request is notified (step d63: Yes), the search result screen is updated and displayed on the display unit 24 (step d64). More specifically, at this moment, the image display data generator 355 responds to the display update request, references the updated reproduction temporary table 29 in accordance with the selected reproduction search condition, and generates the image display data again. Further, the overplay display processing unit 359 uses the image display data generated again to perform processing for updating and displaying the search result screen displayed on the display unit 24.

Thereafter, the processing unit 34 determines whether the search mode is to be terminated. When the search mode is to be terminated (step d65: Yes), the program returns back to step a15 of FIG. 14, and proceeds to step a17. For example, when the operational mode of the digital camera 1 is switched to another operational mode such as the shooting mode and the reproduction mode, the search mode is terminated. When the search mode is not to be terminated (step d65: No), the program returns back to step d15 of FIG. 17.

Figure 20:
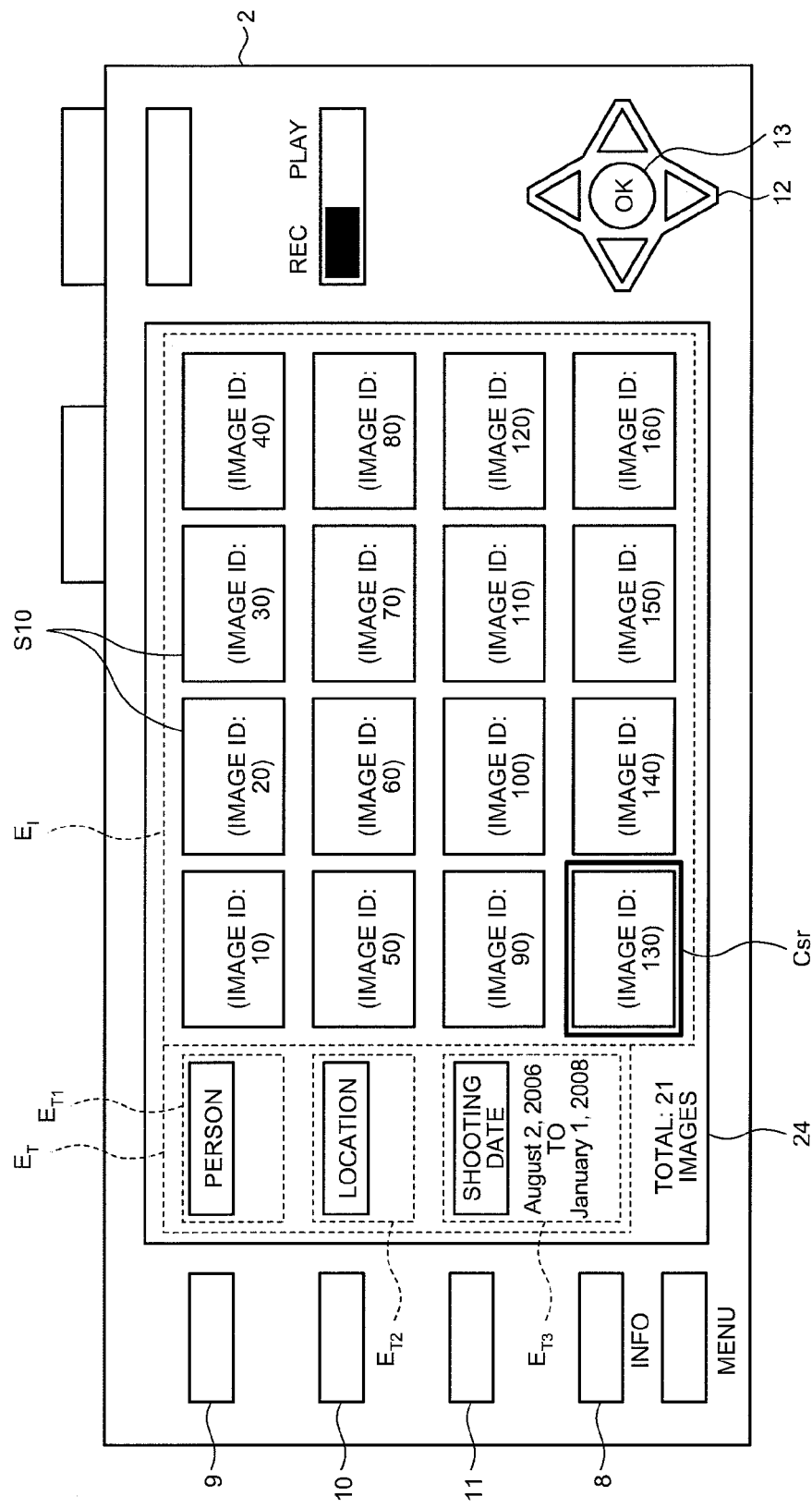
FIG. 20 shows an example of basic configuration of a search result screen.

Subsequently, an example of operation of the digital camera 1 in the search mode will be described. FIG. 20 shows an example of basic configuration of a search result screen displayed on the display unit 24 when a user presses the INFO switch 8 to switch the operational mode to the search mode. FIG. 20 illustrates the search result screen right after the operational mode is switched to the search mode. As illustrated in FIG. 20, the search result screen includes an image display area $E_I$ and a text display area $E_T$.

The image display area $E_I$ displays thumbnail of images of the reproduction object. Right after the operational mode is switched to the search mode, images whose image attribute information is registered to the image attribute information table 26 (i.e., all the images recorded as the image files 270 in the recording unit 25) are adopted as the reproduction object in the image display area $E_I$, and the thumbnails of the images are displayed. The image display area $E_I$ of FIG. 20 shows thumbnails S10 of the images whose image attribute information is registered in the image attribute information table 26 of FIG. 5. In this image display area $E_I$, a user performs selection operation of an image of interest by pressing down the arrow key 12 to move a cursor Csr to a desired thumbnail and pressing down the OK switch 13.

On the other hand, the text display area $E_T$ shows the reproduction search condition and the selected period in text. This text display area $E_T$ includes a person search condition display area $E_{T1}$, a location search condition display area $E_{T2}$, and a shooting period display area $E_{T3}$. When the person search condition is selected as the reproduction search condition, the person search condition display area $E_{T1}$ shows the content thereof in text. When the location search condition is selected as the reproduction search condition, the location search condition display area $E_{T2}$ shows the content thereof in text. The shooting period display area $E_{T3}$ shows shooting periods, in text, of the images displayed as thumbnails and reproduced in the person search condition display area $E_{T1}$. In the example, when a selected period is set, the shooting period display area $E_{T3}$ shows the selected periods in text.

In the example, as illustrated in FIG. 20, the person search condition display area $E_{T1}$ is shown at a position corresponding to the function switch 9 arranged on the camera body 2 and used as the person search switch 9 in the search mode. The location search condition display area $E_{T2}$ is shown at a position corresponding to the function switch 10 used as the location search switch 10 in the search mode. The shooting period display area $E_{T3}$ is shown at a position corresponding to the function switch 11 used as the period selection switch 11 in the search mode.

Figure 21:
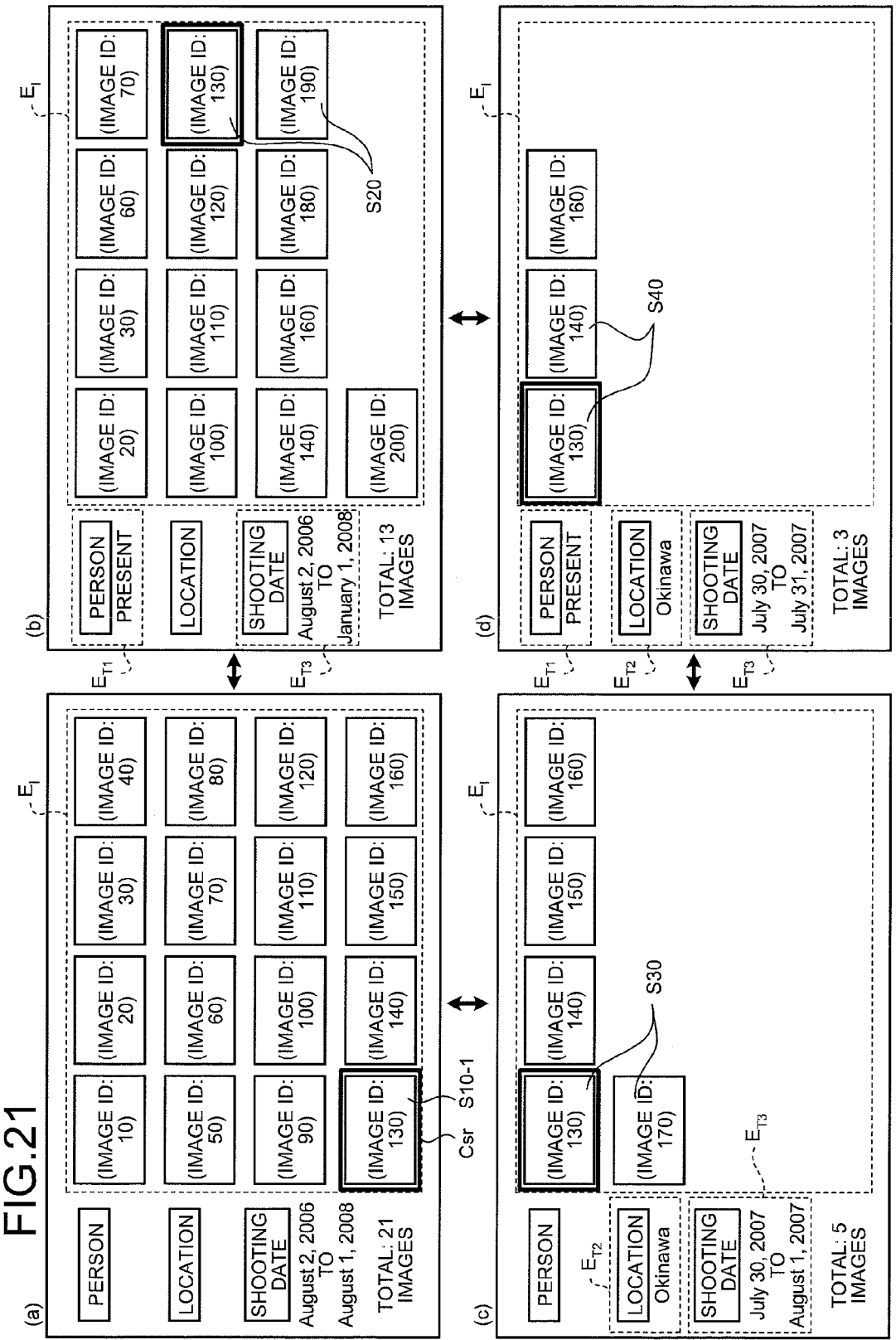
FIG. 21 shows views an example of transition of the search result display screen upon operational input in the search mode.

FIGS. 21, 22, and 23 show examples of transition of the search result display screen upon operational input in the search mode. For example, as illustrated in FIG. 21(a), a user moves the cursor Csr to a thumbnail S10-1 in the image display area $E_I$, and presses down the OK switch 13.

In this case, the image designated with the image ID "130" is selected as an image of interest in the internal processing. Then, the search conditions, i.e., the person search condition, the location search condition, and the person and location search condition, are set on the basis of the person information and the location information of this image of interest, and the reproduction temporary table 29 is generated and stored to the temporary recording unit 28. In this example, as illustrated in the record R11 of FIG. 5, the person information of the image designated with the image ID "130" is "1", and the location information is "Okinawa". Therefore, the person search condition is set to "person is present", the location search condition is set to "Okinawa", and the person and location search condition is set to "person is present and Okinawa". Accordingly, the person search result table 291, the location search result table 292, and the person and location search result table 293 are generated.

Then, the person search switch 9 is pressed down in this state. In this case, the person search condition "person is present" is selected as the reproduction search condition. Consequently, the person search result table 291 is referenced. The person search result table 291 is the search result obtained with the person search condition "person is present" that is set based on the person information of the image of interest. The images whose image attribute information is set in this person search result table 291 are adopted as the reproduction object. As illustrated in FIG. 21(b), thumbnails S20 of the images including the image of interest are arranged in the image display area $E_I$, and the person search result is reproduced with reference to the person search result table 291 generated with respect to the image designated with the image ID "130". Further, the person search condition display area $E_{T1}$ of the text display area $E_T$ shows the person search condition, "present (person is present)", in text. At this moment, the display in the photo shooting period display area $E_{T3}$ is updated to show, in text, the shooting periods of the images reproduced and displayed as thumbnails in the image display area $E_I$.

When the person search switch 9 is pressed down again in the state of FIG. 21(b), the person search condition selected as the reproduction search condition is deselected, and the reproduction search condition is deselected. As a result, the search result screen is displayed again to reproduce all the images illustrated in FIG. 21(a).

On the other hand, when the location search switch 10 is pressed down again in the state of FIG. 21(a), the location search condition "Okinawa" is selected as the reproduction search condition. As a result, the location search result table 292 is referenced. The location search result table 292 is the search result obtained with the location search condition "Okinawa" that is set based on the location information of the image of interest. The images whose image attribute information is set in this location search result table 292 are adopted as the reproduction object. As illustrated in FIG. 21(c), thumbnails S30 of the images including the image of interest are arranged in the image display area $E_I$, and the location search result is reproduced with reference to the location search result table 292 generated with respect to the image designated with the image ID "130". Further, the location search condition display area $E_{T2}$ of the text display area $E_T$ shows the location search condition, "Okinawa", in text. Then, the display in the photo shooting period display area $E_{T3}$ is updated to show, in text, the shooting periods of the images reproduced in the image display area $E_I$.

When the location search switch 10 is pressed down again in the state of FIG. 21(c), the location search condition selected as the reproduction search condition is deselected, and the reproduction search condition is deselected. As a result, the search result screen is displayed again to reproduce all the images illustrated in FIG. 21(a).

Then, the location search switch 10 is pressed in the state illustrated in FIG. 21(b). In this case, the person and location search condition, "person is present and Okinawa", is selected as the reproduction search condition. Consequently, the person and location search result table 293 is referenced. The person and location search result table 293 is the search result obtained with the person and location search condition, "person is present and Okinawa", that is set based on the person information and the location information of the image of interest. The images whose image attribute information is set in this person and location search result table 293 are adopted as the reproduction object. As illustrated in FIG. 21(d), thumbnails S40 of the images including the image of interest are arranged in the image display area $E_I$, and the location search result is reproduced with reference to the person and location search result table 293 generated with respect to the image designated with the image ID "130". Further, the person search condition display area $E_{T1}$ of the text display area $E_T$ shows the person search condition, "person is present", in text. In addition, the location search condition display area $E_{T2}$ shows the location search condition "Okinawa" in text. Then, the display in the photo shooting period display area $E_{T3}$ is updated to show, in text, the shooting periods of the images reproduced in the image display area $E_I$.

When the location search switch 10 is pressed down again in the state of FIG. 21(d), the location search condition selected as the reproduction search condition is deselected, and the reproduction search condition attains the person search condition, "person is present". As a result, the search result screen is displayed again to reproduce the person search result illustrated in FIG. 21(b).

Likewise, when the person search switch 9 is pressed down in the state illustrated in FIG. 21(c), the person and location search condition, "person is present and Okinawa", is selected as the reproduction search condition. Consequently, the person and location search result table 293 is referenced. The person and location search result table 293 is the search result obtained with the person and location search condition, "person is present and Okinawa". The images whose image attribute information is set in this person and location search result table 293 are adopted as the reproduction object. Then, the search result screen illustrated in FIG. 21(d) is displayed, and the location search result is reproduced with reference to the person and location search result table 293. Further, the person search condition display area $E_{T1}$ of the text display area $E_T$ shows the person search condition, "person is present", in text. In addition, the location search condition display area $E_{T2}$ shows the location search condition "Okinawa" in text. Then, the display in the photo shooting period display area $E_{T3}$ is updated to show, in text, the shooting periods of the images reproduced in the image display area $E_I$.

When the person search switch 9 is pressed down again in the state of FIG. 21(d), the person search condition selected as the reproduction search condition is deselected, and the reproduction search condition attains the location search condition "Okinawa". As a result, the search result screen is displayed again to reproduce the location search result illustrated in FIG. 21(c).

Further, as illustrated in FIG. 22(a), in the search result screen in which the person search result is reproduced in the image display area $E_I$, a user moves the cursor Csr from the thumbnail S20-1 of the image designated with the image ID "130" to the thumbnail S20-2 of the image designated with the image ID "120" and presses down the OK switch 13. In this case, the image of interest is changed to the image designated with the image ID "120".

In this case, when a user performs selection operation of an image of interest, the reproduction search condition is deselected, and the reproduction temporary table 29 generated for the image designated with the image ID "130" is deleted. Thereafter, the image designated with the image ID "120" is newly selected as an image of interest in the internal processing. Then, the search conditions, i.e., the person search condition, the location search condition, and the person and location search condition, are set on the basis of the person information and the location information of this image of interest, and the reproduction temporary table 29 is generated and stored to the temporary recording unit 28. In this example, as illustrated in FIG. 5, the person information of the image designated with the image ID "120" is "2", and the location information is "Tokyo". Therefore, the person search condition is set to "person is present", the location search condition is set to "Tokyo", and the person and location search condition is set to "person is present and Tokyo". Accordingly, the person search result table 291, the location search result table 292, and the person and location search result table 293 are generated.

Then, the location search switch 10 is pressed down in this state. In this case, the location search result table 292 is referenced. The location search result table 292 is the search result obtained with the location search condition "Tokyo" that is set based on the location information of the image of interest. The images whose image attribute information is set in this location search result table 292 are adopted as the reproduction object. As illustrated in FIG. 22(b), thumbnails S50 of the images including the image of interest are arranged in the image display area $E_I$, and the person search result is reproduced with reference to the location search result table 292 generated with respect to the image designated with the image ID "120". Further, the location search condition display area $E_{T2}$ of the text display area $E_T$ shows the location search condition "Tokyo" in text. Then, the display in the photo shooting period display area $E_{T3}$ is updated to show, in text, the shooting periods of the images reproduced in the image display area $E_I$.

A user presses down the period selection switch 11 on the search result screen reproducing the location search result including the thumbnail S30-1 of the image of interest designated with the image ID "130" in the image display area $E_I$ as illustrated in FIG. 23(a).

In this case, when a user performs selection operation of a period of time, the reproduction search condition is deselected. In the internal processing, the location search result table 292 currently being reproduced is referenced, and the selected period is set. Then, the selected period image list table 30 is generated and recorded to the temporary recording unit 28. At this moment, in the example of FIG. 23(a), the shooting period of the images being reproduced is Jul. 30, 2007, to Aug. 1, 2007. Jul. 30, 2007, to Aug. 1, 2007, is set as the selected period. Then, the image attribute information whose shooting dates are included in this selected period is read from the image attribute information table 26, and the selected period image list table 30 is generated. As illustrated in FIG. 23(b), thumbnails S60 are arranged in the image display area $E_I$. The thumbnails S60 represent the images whose shooting data is in the selected period and which include the image of interest. Then, the display of the shooting period display area $E_{T3}$ is updated, and the selected period is displayed in text.

As described above, in the present embodiment, the following three conditions are assumed to be respectively selected when an image of interest is selected: a person search condition, i.e., person information of the image of interest; a location search condition, i.e., location information of the image of interest; and a person and location search condition, i.e., the person information and the location information of the image of interest. Accordingly, the person search result table 291, the location search result table 292, and the person and location search result table 293 can be generated as the reproduction temporary table 29 at first. The person search result table 291 is a search result obtained by using the person search condition as the search condition. The location search result table 292 is a search result obtained by using the location search condition as the search condition. The person and location search result table 293 is a search result obtained by using the person and location search condition as the search condition. Then, a user selects a reproduction search condition by performing pressing operation of the person search switch 9, the location search switch 10, or a combination thereof, so that a corresponding reproduction temporary table 29 is referenced in accordance with the reproduction search condition selected by the user, and the search result is reproduced. In other words, when the person search condition is selected as the reproduction search condition, the person search result can be reproduced by referencing the person search result table 291. When the location search condition is selected as the reproduction search condition, the location search result can be reproduced by referencing the location search result table 292. When the person and location search condition is selected as the reproduction search condition, the person and location search result can be reproduced by referencing the person and location search result table 293. Therefore, the present embodiment achieves an effect of reducing a search time and efficiently searching the images.

Further, according to the present embodiment, when the period selection switch 11 is pressed down, a shooting period of an image currently being reproduced is set as a selected period, and the selected period image list table 30 can be generated by obtaining image attribute information of images whose shooting dates are included in the selected period. Then, the images in the selected period can be reproduced by referencing this selected period image list table 30.

The order of generation (the order of generation reproduction information) of reproduction temporary tables 29 may be set when an image of interest is selected by the target image selector 347. The reproduction temporary tables 29 include the person search result table 291, the location search result table 292, and the person and location search result table 293 generated by the reproduction information generating/updating unit 351. In this case, a digital camera can be structured by adding a reproduction information generation order setting unit to the processing unit 34 illustrated in FIG. 2. In this variation, when an image of interest is selected, two types of search conditions, i.e., a person search condition and a location search condition, can be set as a search condition.

This reproduction information generation order setting unit sets the order of generation of reproduction information in accordance with, for example, whether the location search switch 10 is pressed down or the previously-selected person search switch 9 is pressed down. This is because, for example, when the person search switch 9 is previously pressed down, the location search switch 10 is expected to be subsequently pressed down. Likewise, when the location search switch 10 is previously pressed down, the person search switch 9 is expected to be subsequently pressed down. The reproduction information generation order setting unit works as described above on the basis of user's mentality in which a user is likely to search the location appearing a reproduced image when the user sees a search result obtained with a person search condition.

In this case, for example, when the person search switch 9 is pressed down first, the reproduction information generation order setting unit sets the order of subsequent generation of reproduction information to the following order: the location search result table and then the person search result table. On the other hand, when the location search switch 10 is pressed down first, the reproduction information generation order setting unit sets the order of subsequent generation of reproduction information to the following order: the person search result table and then the location search result table.

When there are many images, it takes a certain amount of time to generate, for example, the person search result table and the location search result table. Therefore, when the person search switch 9 or the location search switch 10 is pressed down right after an image of interest is selected, a user has to wait until these reproduction temporary tables are generated. In order to alleviate such problem, the order of generation of reproduction information may be set in advance, and if the person search switch 9 or the location search switch 10 is pressed down according to the expected order, the waiting time of a user can be reduced. In this example, if the person search switch 9 is pressed down when the reproduction temporary tables are generated, e.g., in the following order: the person search result table and then the location search result table, the waiting time can be reduced because the person search result table is generated first. In a case where the order of generation of reproduction information is set to the following order: the person search result table and then the location search result table, and the location search switch 10 is pressed down during generation of the person search result table, the generation of the person search result table is interrupted, and the location search result table is generated first.

Alternatively, every time a user performs selection operation of an image of interest, the order of generation of reproduction information may be set by alternately switching the order. In this case, the reproduction information generation order setting unit sets the predetermined order as, for example, the initial order of generation of reproduction information. For example, the order is set to the following order: the person search result table and then the location search result table. Thereafter, every time a user performs selection operation of an image of interest, the reproduction information generation order setting unit sets the order of generation of reproduction information by switching this order.

FIG. 24 is a flowchart illustrating a portion of the procedure of the search mode processing according to this variation. In FIG. 24, the same steps as those in the above embodiment are denoted with the same reference numerals. As illustrated in FIG. 24, after the search condition setting unit sets a search condition in step d7, the reproduction information generation order setting unit sets the order of generation of reproduction information by switching the two search conditions, i.e., the person search condition and the location search condition (step e9). Then, the reproduction information generating/updating unit generates the person search result table and the location search result table in accordance with the order of generation of reproduction information set in step e9 (step e11). Thereafter, the program proceeds to step d15.

Two types of search conditions, i.e., the person search condition and the location search condition, have been described hereinabove. Alternatively, when three or more types of search conditions are set, the order of generation of reproduction order may be set in a circulating manner such that the first reproduction temporary table in the current order is set to the last of the subsequent order.

In the above embodiments, the reproduction temporary table 29 is recorded to the temporary recording unit 28, and the reproduction temporary table 29 generated with respect to a previous image of interest is deleted when a user performs selection operation of a new image of interest. Alternatively, the generated reproduction temporary table may not be deleted and may be recorded to the recording unit 25 in association with the image ID of the image of interest. When a reproduction temporary table 29 for a plurality of images of interest is recorded, tables may be independently recorded for respective image IDs, or one table may recorded upon being associated with the plurality of image IDs.

In the above embodiment, a user operates the arrow key 12 to move a cursor, and decides selection operation of an image of interest by pressing down the OK switch 13. But selection operation of an image of interest may be decided as soon as the cursor is moved. In this case, a reproduction temporary table adopting an image as an image of interest may be generated every time the cursor is moved.

With a digital camera in which a display unit arranged on the back of the camera body is arranged with a touch panel, selection operation of an image of interest may be achieved by allowing a user to operate this touch panel. In this case, operation for selecting a person search condition as a reproduction search condition may be achieved by, for example, allowing a user to drag and drop the thumbnail of an image of interest to the person search condition display area $E_{T1}$ as illustrated in FIG. 20, instead of having a user press down the person search switch 9. Further, operation of deselecting a person search condition as a reproduction search condition may be achieved by, for example, allowing a user to drag and drop the person search condition represented in text the person search condition display area $E_{T1}$ as illustrated in FIG. 20 to the outside of the person search condition display area $E_{T1}$, instead of having a user press down the person search switch 9 again. Likewise, selection operation/deselection operation of a location search condition may also be performed by drag and drop operation, instead of pressing down the location search switch 10.

In the above embodiment, the GPS data is converted into the location information. Alternatively, the GPS data may be used as the location information without any conversion. In this case, a location search result table may be generated by reading from the image attribute information table the image attribute information of images shot at positions within a predetermined range about a latitude, longitude, and altitude, i.e., the location information of an image of interest.

In the above embodiments, the person search condition, the location search condition, and the person and location search condition are set as the search condition, but the search condition is not limited to the above conditions. For example, the search condition may be an OR condition requiring either the person search condition or the location search condition to be satisfied.

In the above embodiments, the location information at the shooting date and the feature information extracted from the analyzed image data are used as attribute values representing attributes of images, and accordingly the search condition is set. But the search condition is not limited thereto. The search condition may be set as necessary in accordance with values used as feature information.

In the above embodiments, the reproduction apparatus according to an aspect of the present invention is applied to a digital camera, but the present invention is not limited thereto. For example, the reproduction apparatus according to an aspect of the present invention may be applied to a portable telephone equipped with a camera. Further, the reproduction apparatus is not limited to an apparatus having the imaging unit 21 (camera). The reproduction apparatus according to an aspect of the present invention may be applied to a PC storing a plurality of images.

According to an aspect of the present invention, the attribute value related to the image of interest is set as the search condition, and the reproduction information is generated by setting the image attribute information satisfying the set search condition. When the search condition is selected as the reproduction search condition, the images of the image attribute information set as the reproduction information are displayed on the display unit as the reproduction object, and consequently the search result of the image of interest can be reproduced. Therefore, it is not necessary to search images every time a reproduction search condition is selected. As a result, the present invention achieves an effect of reducing a search time and efficiently searching the images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproduction apparatus for respectively reproducing plural images, comprising:
    an attribute information recording unit that records image attribute information in which an attribute value representing an image attribute is set for each image;
    a target image selector that selects an image of interest from among plural images;
    a search condition setting unit that sets, as a search condition including a person search condition and a location search condition, an attribute value related to the image of interest set in the image attribute information responsive to the image of interest being selected by the target image selector;
    a reproduction information generator that generates reproduction information, responsive to the search condition being set by the search condition setting unit, by setting one of pieces of image attribute information that satisfies the search condition and by referencing an image attribute information table to generate (1) a person search result table in which image attribute information satisfying the person search condition is set, and (2) a location search result table in which image attribute information satisfying the location search condition is set;
    a search condition selector that selects the search condition as a reproduction search condition;
    a search result reproducing unit that reproduces a search result with respect to the image of interest by displaying, on a display unit, an image whose image attribute information is designated with the reproduction information as a reproduction object, when the reproduction search condition is selected by the search condition selector;
    an image obtaining unit that obtains an image; and
    an image attribute information adding unit, wherein when the image is obtained by the image obtaining unit, the image attribute information adding unit generates image attribute information in which an attribute value related to the image is set, and additionally records to the image attribute information to the attribute information recording unit, wherein when the image attribute information newly generated by the image attribute information adding unit satisfies the search condition, the reproduction information generator updates the reproduction information by adding the image attribute information.

2. The reproduction apparatus according to claim 1, wherein
    the image attribute information includes a plurality of attribute values related to the images,
    the search condition setting unit sets the plurality of attribute values related to the image of interest so that each of the plurality of attribute values respectively serves as the search condition, thereby defining a plurality of search conditions,
    the reproduction information generator generates the reproduction information for each of the plurality of search conditions set by the search condition setting unit,
    the search condition selector selects one of the plurality of search conditions as the reproduction search condition, and
    when the reproduction search condition is selected by the search condition selector, the search result reproducing unit references the reproduction information, generated by the reproduction information generator, of the selected reproduction search condition, and the search result reproducing unit reproduces the search result upon adopting, as a reproduction object, an image whose attribute information is designated with the reproduction information.

3. The reproduction apparatus according to claim 2, wherein the search condition setting unit further sets a search condition including a combination of the plurality of attribute values related to the image of interest.

4. The reproduction apparatus according to claim 2 further comprising a reproduction information generation order setting unit, wherein when the image of interest is subsequently selected by the target image selector on the basis of the reproduction search condition selected by the search condition selector, and the search condition is set by the search condition setting unit, the reproduction information generation order setting unit sets the order of generation of the reproduction information generated for each of the plurality of search conditions by the reproduction information generator.

5. The reproduction apparatus according to claim 1, further comprising:
   an image feature extracting unit that analyzes the images and extracts feature information of the images; and
   an image attribute information generator that generates the image attribute information upon adopting the feature information extracted by the image feature information extracting unit as attribute values related to the images, and records the image attribute information to the attribute information recording unit.

6. The reproduction apparatus according to claim 5, wherein the image feature extracting unit extracts a number of persons appearing in each image as the feature information.

7. The reproduction apparatus according to claim 1, wherein when the reproduction information is updated by the reproduction information generator, the search result reproduction unit reproduces the search result again upon adopting, as the reproduction object, the image whose image attribute information is designated with the updated reproduction information.

8. The reproduction apparatus according to claim 1, wherein when the image of interest is newly selected by the target image selector, the reproduction information generator performs processing for deleting the reproduction information having the attribute information of the previously selected image of interest as the search condition, and newly generates reproduction information having the attribute value of the newly selected image of interest as the search condition.

9. The reproduction apparatus according to claim 1, wherein the attribute value includes a shooting location of the image.

10. The reproduction apparatus according to claim 1, wherein the image is recorded in association with a shooting date, and
   the reproduction apparatus further comprises:
   a period setting unit for setting a shooting period of image adopted as the reproduction object by the search result reproduction unit, on the basis of the image attribute information designated with the reproduction information; and
   a period-based image reproduction unit, wherein when the shooting period is set by the period setting unit, the period-based image reproduction unit displays, on the display unit, the image whose shooting date is included in the shooting period as the reproduction object.

11. A reproduction method by which plural images are reproduced, respectively, by the reproduction apparatus that records image attribute information in which an attribute value representing an image attribute is set for each image, the reproduction method comprising:
   selecting an image of interest from among plural images;
   setting, as a search condition including a person search condition and a location search condition, an attribute value related to the image of interest set in the image attribute information responsive to the image of interest being selected;
   generating reproduction information, responsive to the search condition being set, by setting one of pieces of image attribute information that satisfies the search condition and by referencing an image attribute information table to generate (1) a person search result table in which image attribute information satisfying the person search condition is set, and (2) a location search result table in which image attribute information satisfying the location search condition is set;
   selecting the search condition as reproduction search condition;
   reproducing a search result with respect to the image of interest by displaying an image whose image attribute information is designated with the reproduction information as a reproduction object, when the reproduction search condition is selected;
   obtaining an image; and
   when the image is obtained, generating and recording image attribute information in which an attribute value related to the image is set, wherein the generating the reproduction information, when the image attribute information newly generated in the generating and recording the image attribute information satisfies the search condition, the reproduction information is updated by adding the image attribute information.

12. The reproduction method according to claim 11,
   wherein the image attribute information includes a plurality of attribute values related to the images,
   the setting the search condition includes setting the plurality of attribute values related to the image of interest so that each of the plurality of attribute values respectively serves as a search condition, thereby defining a plurality of search conditions
   the generating the reproduction information includes generating the reproduction information for each of the plurality of search conditions set in the setting the search condition,
   the selecting the search condition includes selecting one of the plurality of search conditions as the reproduction search condition, and
   the reproducing the search result includes, when the reproduction search condition is selected in the selecting the search condition, referencing to the reproduction information generated in the generating the reproduction information with respect to the selected reproduction search condition, and reproducing the search result upon adopting, as a reproduction object, an image whose attribute information is designated with the reproduction information.

13. The reproduction method according to claim 12, wherein the setting the search condition includes further setting a search condition including a combination of the plurality of attribute values related to the image of interest.

14. The reproduction method according to claim 11, further comprising:
   analyzing the image and extracting feature information of the image; and
   generating and recording the image attribute information upon adopting the extracted feature information as an attribute value related to the image.

15. The reproduction method according to claim 11, wherein the selecting the image of interest includes, when the image of interest is selected, setting the search condition, and the generating the reproduction information includes, when the search condition is set in the setting the search condition, generating the reproduction information.

16. The reproduction method according to claim 11, wherein the generating the reproduction information includes, when the image of interest is newly selected in the step of selection of the image of interest, deleting the reproduction information having the attribute information of the previously selected image of interest as the search condition, and generating reproduction information having the attribute value of the newly selected image of interest as the search condition.

17. The reproduction method according to claim 11, wherein the image is recorded in association with a shooting date, and the reproduction method further comprises:
setting a shooting period of image adopted as the reproduction object in the reproducing the search result, on the basis of the image attribute information designated with the reproduction information; and
when the shooting period is set in the step of setting of the shooting period, displaying the image whose shooting date is included in the shooting period as the reproduction object.

18. A reproduction method by which plural images are reproduced, respectively, by the reproduction apparatus that records image attribute information in which an attribute value representing an image attribute is set for each image, the reproduction method comprising:

selecting an image of interest from among plural images;
setting, as a search condition, an attribute value related to the image of interest set in the image attribute information responsive to the image of interest being selected;
generating reproduction information, responsive to the search condition being set, by setting one of pieces of image attribute information that satisfies the search condition;
selecting the search condition as reproduction search condition; and
reproducing a search result with respect to the image of interest by displaying an image whose image attribute information is designated with the reproduction information as a reproduction object, when the reproduction search condition is selected,
wherein the search condition includes a person search condition and a location search condition, and
wherein the act of generating reproduction information, responsive to the search condition being set, by setting one of pieces of image attribute information that satisfies the search condition includes referencing an image attribute information table to generate (1) a person search result table in which image attribute information satisfying the person search condition is set, and (2) a location search result table in which image attribute information satisfying the location search condition is set.

* * * * *